United States Patent
Lyu et al.

(10) Patent No.: US 9,843,356 B2
(45) Date of Patent: Dec. 12, 2017

(54) WIRELESS COMMUNICATIONS METHOD, USER EQUIPMENT, BASE STATION AND SYSTEM

(71) Applicant: Huawei Technologies Co., Ltd., Shenzhen (CN)

(72) Inventors: Yongxia Lyu, Beijing (CN); Tong Ji, Beijing (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/383,878

(22) Filed: Dec. 19, 2016

(65) Prior Publication Data

US 2017/0099078 A1    Apr. 6, 2017

Related U.S. Application Data

(63) Continuation of application No. 14/866,282, filed on Sep. 25, 2015, now Pat. No. 9,553,632, which is a
(Continued)

(51) Int. Cl.
*H04B 1/709* (2011.01)
*H04W 4/00* (2009.01)
(Continued)

(52) U.S. Cl.
CPC ....... *H04B 1/709* (2013.01); *H04L 25/03006* (2013.01); *H04W 4/005* (2013.01);
(Continued)

(58) Field of Classification Search
CPC .................. H04B 1/709; H04B 1/69; H04B 2201/70703; H04W 4/005; H04W 88/08; H04J 13/0003
See application file for complete search history.

(56) References Cited

U.S. PATENT DOCUMENTS 7,751,499 B2 *  7/2010  Olsson ................ H04B 1/7103
                                                         375/316
2004/0081227 A1    4/2004  Lim et al.
(Continued)

FOREIGN PATENT DOCUMENTS

CN         1705240 A     12/2005
CN       101534278 A      9/2009
(Continued)

OTHER PUBLICATIONS

Puri et al., "Two-dimensional spreading scheme employing 2D orthogonal variable spreading factor codes for orthogonal frequency and code division multiplexing systems." IET Communications, vol. 7, Issue 5, pp. 462-470, The Institution of Engineering and Technology, London, England (Mar. 26, 2013).
(Continued)

*Primary Examiner* — Dac Ha
(74) *Attorney, Agent, or Firm* — Leydig, Voit & Mayer, Ltd.

(57) ABSTRACT

Embodiments of the present disclosure provide a wireless communications method, user equipment, a base station and a system, and relate to the field of wireless communications. The method includes: acquiring a frequency domain spreading factor, a symbol-level spreading factor and a transmission time interval-level spreading factor; and performing frequency domain spreading, symbol-level spreading and transmission time interval-level spreading on first to-be-sent information respectively according to the acquired spreading factors and sending first spread information; or, despreading, according to the acquired spreading factors, second spread information sent by a base station.

6 Claims, 8 Drawing Sheets

Related U.S. Application Data continuation of application No. PCT/CN2013/073264, filed on Mar. 27, 2013.

(51) Int. Cl.
  *H04W 24/02* (2009.01)
  *H04L 25/03* (2006.01)
  *H04W 88/08* (2009.01)

(52) U.S. Cl.
  CPC ... *H04W 24/02* (2013.01); *H04B 2201/70705* (2013.01); *H04W 88/08* (2013.01)

(56) References Cited

U.S. PATENT DOCUMENTS

| | | |
|---|---|---|
| 2005/0190715 A1 | 9/2005 | McNamara |
| 2007/0242732 A1 | 10/2007 | Hsieh |
| 2009/0135788 A1* | 5/2009 | Zuniga .................. H04J 13/20 370/335 |
| 2011/0243197 A1 | 10/2011 | Atarashi et al. |
| 2012/0039281 A1 | 2/2012 | Pajukoski et al. |
| 2013/0301683 A1 | 11/2013 | Sinsuan et al. |
| 2014/0098782 A1 | 4/2014 | Shirazi et al. |
| 2014/0269847 A1* | 9/2014 | Chiu .................. H04B 1/71055 375/148 |
| 2014/0286259 A1 | 9/2014 | Han et al. |

FOREIGN PATENT DOCUMENTS

| | | |
|---|---|---|
| CN | 102273114 A | 12/2011 |
| WO | 2010052800 A1 | 5/2010 |

OTHER PUBLICATIONS

Chen, "Research on the key technology of MC-CDMA in Mobile Communication," National University of Defense Technology (Sep. 1, 2007).

"3$^{rd}$ Generation Partnership Project; Technical Specification Group Radio Access Network; Evolved Universal Terrestrial Radio Access (E-UTRA); Physical Channels and Modulation (Release 11)," 3GPP TS 36.211, V11.2.0, pp. 1-109, 3$^{rd}$ Generation Partnership Project, Valbonne, France (Feb. 2013).

"3$^{rd}$ Generation Partnership Project; Technical Specification Group Radio Access Network; Evolved Universal Terrestrial Radio Access (E-UTRA); Physical layer procedures (Release 11)," 3GPP TS 36.213, V11.2.0, pp. 1-173, 3$^{rd}$ Generation Partnership Project, Valbonne, France (Feb. 2013).

\* cited by examiner

WIRELESS COMMUNICATIONS METHOD, USER EQUIPMENT, BASE STATION AND SYSTEM

CROSS-REFERENCE TO RELATED APPLICATIONS

This application is a continuation of U.S. patent application Ser. No. 14/866,282, filed on Sep. 25, 2015, which is a continuation of International Patent Application No. PCT/CN2013/073264, filed on Mar. 27, 2013, both of which are hereby incorporated by reference in their entireties.

TECHNICAL FIELD

The present disclosure relates to the field of wireless communications, and in particular, to a wireless communications method, user equipment, a base station and a system.

BACKGROUND

Machine-to-machine (M2M) is a networked application service that focuses on intelligent interaction between machine terminals. By embedding a wireless communications module inside a machine and using wireless communication as access means, M2M provides a comprehensive informatization solution to customers, so as to satisfy informatization requirements of customers in aspects such as monitoring, commanding and scheduling, data collection and measurement. An M2M application is deployed based on an existing wireless communications standard, and generally applied to an environment unfavorable to wireless transmission such as streets and underground garages. Therefore, when sending information, the M2M application needs to have a coverage gain compared with the existing wireless communications standard.

According to an existing M2M wireless communications method, an M2M device sends information data repetitively for multiple times in a frequency domain or time domain, thereby achieving an objective of improving a coverage gain of information sending. Specifically, for example, when sending information based on an long term evolution (LTE) system, an M2M device needs a coverage gain of at least 20 dB compared with an existing LTE system. However, on the premise of ideal channel estimation, if a coverage gain of 20 dB needs to be achieved, each channel in the LTE system needs to repetitively send data for approximately 100 times at most. However, in a situation of actual channel estimation, in consideration of a relatively high requirement of a low signal to noise ratio on the channel estimation, if a coverage gain of 20 dB needs to be achieved, data needs to be repetitively sent for approximately 300 to 400 times at most.

During implementation of the present disclosure, the inventor finds that the prior art has at least the following problems:

According to the existing wireless communications method, a relatively large quantity of times of repetitive sending needs to be performed, and when simple repetitive sending is performed in a frequency domain or time domain, sending efficiency is low, delay is relatively long, and interference between user equipments in a same frequency is relatively severe, thereby reducing system capacity and resource utilization, and affecting system performance.

SUMMARY

To solve problems in the prior art that when simple repetitive sending is performed in a frequency domain or time domain, sending efficiency is low, delay is relatively long, and interference between user equipments in a same frequency is relatively severe, embodiments of the present disclosure provide a wireless communications method, user equipment, a base station, and a system. The technical solutions are as follows:

According to a first aspect, a wireless communications method, used in an M2M system, is provided, where the method includes:

acquiring a frequency domain spreading factor, a symbol-level spreading factor and a transmission time interval-level spreading factor; and performing frequency domain spreading, symbol-level spreading and transmission time interval-level spreading on first to-be-sent information respectively according to the acquired frequency domain spreading factor, symbol-level spreading factor and transmission time interval-level spreading factor, to obtain first spread information, and sending the first spread information to a base station; or, receiving second spread information sent by a base station, and performing frequency domain despreading, symbol-level despreading and transmission time interval-level despreading on the received second spread information respectively according to the acquired frequency domain spreading factor, symbol-level spreading factor and transmission time interval-level spreading factor, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor.

In a first possible implementation manner of the first aspect, the acquiring a frequency domain spreading factor, a symbol-level spreading factor and a transmission time interval-level spreading factor includes:

receiving the frequency domain spreading factor, the symbol-level spreading factor and the transmission time interval-level spreading factor that are sent by the base station;

or receiving some spreading factors that are of the frequency domain spreading factor, the symbol-level spreading factor and the transmission time interval-level spreading factor and are sent by the base station, and acquiring the prestored remaining spreading factors of the frequency domain spreading factor, the symbol-level spreading factor and the transmission time interval-level spreading factor.

With reference to the first possible implementation manner of the first aspect, in a second possible implementation manner of the first aspect, the receiving the frequency domain spreading factor, the symbol-level spreading factor and the transmission time interval-level spreading factor that are sent by the base station includes:

receiving the frequency domain spreading factor, the symbol-level spreading factor and the transmission time interval-level spreading factor that are sent in a signaling manner by the base station; and the receiving some spreading factors that are of the frequency domain spreading factor, the symbol-level spreading factor and the transmission time interval-level spreading factor and are sent by the base station includes:

receiving some spreading factors that are of the frequency domain spreading factor, the symbol-level spreading factor and the transmission time interval-level spreading factor and are sent in a signaling manner by the base station.

With reference to the second possible implementation manner of the first aspect, in a third possible implementation manner of the first aspect, the symbol-level spreading factor is sent in a physical-layer signaling manner by the base station, and the transmission time interval-level spreading factor is sent in a higher-layer signaling manner by the base station.

In a fourth possible implementation manner of the first aspect, the performing frequency domain spreading, symbol-level spreading and transmission time interval-level spreading on first to-be-sent information respectively according to the acquired frequency domain spreading factor, symbol-level spreading factor and transmission time interval-level spreading factor includes:

generating a spreading sequence for frequency domain spreading according to the acquired frequency domain spreading factor, and performing frequency domain spreading on the first to-be-sent information according to the generated spreading sequence for frequency domain spreading;

generating a spreading sequence for symbol-level spreading according to the acquired symbol-level spreading factor, and performing symbol-level spreading on the first to-be-sent information according to the generated spreading sequence for symbol-level spreading; and generating a spreading sequence for transmission time interval-level spreading according to the acquired transmission time interval-level spreading factor, and performing transmission time interval-level spreading on the first to-be-sent information according to the generated spreading sequence for transmission time interval-level spreading.

With reference to the fourth possible implementation manner of the first aspect, in a fifth possible implementation manner of the first aspect, the transmission time interval-level spreading factor includes an actual spreading factor and a replication factor;

the generating a spreading sequence for transmission time interval-level spreading according to the acquired transmission time interval-level spreading factor includes:

generating the spreading sequence for transmission time interval-level spreading according to the actual spreading factor; and after the performing transmission time interval-level spreading on the first to-be-sent information according to the generated spreading sequence for transmission time interval-level spreading, the method further includes:

replicating first transmission time interval-level spreading information according to the replication factor, where the first transmission time interval-level spreading information is information obtained after transmission time interval-level spreading is performed on the first to-be-sent information according to the generated spreading sequence for transmission time interval-level spreading.

With reference to the fourth possible implementation manner of the first aspect, in a sixth possible implementation manner of the first aspect, the spreading sequence for frequency domain spreading is a ZC sequence or a Gray code.

In a seventh possible implementation manner of the first aspect, the performing frequency domain despreading, symbol-level despreading and transmission time interval-level despreading on the received second spread information respectively according to the acquired frequency domain spreading factor, symbol-level spreading factor and transmission time interval-level spreading factor includes:

generating a spreading sequence for frequency domain spreading according to the acquired frequency domain spreading factor, and performing frequency domain despreading on the second spread information according to the generated spreading sequence for frequency domain spreading;

generating a spreading sequence for symbol-level spreading according to the acquired symbol-level spreading factor, and performing symbol-level despreading on the second spread information according to the generated spreading sequence for symbol-level spreading; and generating a spreading sequence for transmission time interval-level spreading according to the acquired transmission time interval-level spreading factor, and performing transmission time interval-level despreading on the second spread information according to the generated spreading sequence for transmission time interval-level spreading.

According to a second aspect, a wireless communications method, used in an M2M system, is provided, where the method includes:

acquiring a frequency domain spreading factor, a symbol-level spreading factor and a transmission time interval-level spreading factor;

sending all or some spreading factors of the acquired frequency domain spreading factor, symbol-level spreading factor and transmission time interval-level spreading factor to user equipment; and receiving first spread information sent by the user equipment, and performing frequency domain despreading, symbol-level despreading and transmission time interval-level despreading on the received first spread information respectively according to the acquired frequency domain spreading factor, symbol-level spreading factor and transmission time interval-level spreading factor, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor; or, performing frequency domain spreading, symbol-level spreading and transmission time interval-level spreading on second to-be-sent information respectively according to the acquired frequency domain spreading factor, symbol-level spreading factor and transmission time interval-level spreading factor, to obtain second spread information, and sending the second spread information to the user equipment.

In a first possible implementation manner of the second aspect, the acquiring a frequency domain spreading factor, a symbol-level spreading factor and a transmission time interval-level spreading factor includes:

determining the frequency domain spreading factor, the symbol-level spreading factor and the transmission time interval-level spreading factor according to a first predetermined spreading factor selection policy, where the first predetermined spreading factor selection policy includes correspondences between quality of a channel environment in which the user equipment is located and the frequency domain spreading factor, the symbol-level spreading factor and the transmission time interval-level spreading factor.

With reference to the first possible implementation manner of the second aspect, in a second possible implementation manner of the second aspect, the sending all or some spreading factors of the acquired frequency domain spreading factor, symbol-level spreading factor and transmission time interval-level spreading factor to user equipment includes:

sending, to the user equipment and in a signaling manner, the frequency domain spreading factor, the symbol-level spreading factor and the transmission time interval-level spreading factor that are determined according to the first predetermined spreading factor selection policy.

In a third possible implementation manner of the second aspect, the acquiring a frequency domain spreading factor, a symbol-level spreading factor and a transmission time interval-level spreading factor includes:

determining some spreading factors of the frequency domain spreading factor, the symbol-level spreading factor and the transmission time interval-level spreading factor according to a second predetermined spreading factor selection policy, where the second predetermined spreading factor selection policy includes a correspondence between quality of a channel environment in which the user equipment is located and the some spreading factors of the frequency domain spreading factor, the symbol-level spreading factor and the transmission time interval-level spreading factor; and acquiring the prestored remaining spreading factors of the frequency domain spreading factor, the symbol-level spreading factor and the transmission time interval-level spreading factor.

With reference to the third possible implementation manner of the second aspect, in a fourth possible implementation manner of the second aspect, the sending all or some spreading factors of the acquired frequency domain spreading factor, symbol-level spreading factor and transmission time interval-level spreading factor to user equipment includes:

sending, to the user equipment and in a signaling manner, the some spreading factors that are of the frequency domain spreading factor, the symbol-level spreading factor and the transmission time interval-level spreading factor and are determined according to the second predetermined spreading factor selection policy.

With reference to the second or fourth possible implementation manner of the second aspect, in a fifth possible implementation manner of the second aspect, the symbol-level spreading factor is sent in a physical-layer signaling manner, and the transmission time interval-level spreading factor is sent in a higher-layer signaling manner.

In a sixth possible implementation manner of the second aspect, the performing frequency domain despreading, symbol-level despreading and transmission time interval-level despreading on the received first spread information respectively according to the acquired frequency domain spreading factor, symbol-level spreading factor and transmission time interval-level spreading factor includes:

generating a spreading sequence for frequency domain spreading according to the acquired frequency domain spreading factor, and performing frequency domain despreading on the first spread information according to the generated spreading sequence for frequency domain spreading;

generating a spreading sequence for symbol-level spreading according to the acquired symbol-level spreading factor, and performing symbol-level despreading on the first spread information according to the generated spreading sequence for symbol-level spreading; and generating a spreading sequence for transmission time interval-level spreading according to the acquired transmission time interval-level spreading factor, and performing transmission time interval-level despreading on the first spread information according to the generated spreading sequence for transmission time interval-level spreading.

In a seventh possible implementation manner of the second aspect, the performing frequency domain spreading, symbol-level spreading and transmission time interval-level spreading on second to-be-sent information respectively according to the acquired frequency domain spreading factor, symbol-level spreading factor and transmission time interval-level spreading factor includes:

generating a spreading sequence for frequency domain spreading according to the acquired frequency domain spreading factor, and performing frequency domain spreading on the second to-be-sent information according to the generated spreading sequence for frequency domain spreading;

generating a spreading sequence for symbol-level spreading according to the acquired symbol-level spreading factor, and performing symbol-level spreading on the second to-be-sent information according to the generated spreading sequence for symbol-level spreading; and generating a spreading sequence for transmission time interval-level spreading according to the acquired transmission time interval-level spreading factor, and performing transmission time interval-level spreading on the second to-be-sent information according to the generated spreading sequence for transmission time interval-level spreading.

With reference to the seventh possible implementation manner of the second aspect, in an eighth possible implementation manner of the second aspect, the transmission time interval-level spreading factor includes an actual spreading factor and a replication factor;

the generating a spreading sequence for transmission time interval-level spreading according to the acquired transmission time interval-level spreading factor includes:

generating the spreading sequence for transmission time interval-level spreading according to the actual spreading factor; and after the performing transmission time interval-level spreading on the second to-be-sent information according to the generated spreading sequence for transmission time interval-level spreading, the method further includes:

replicating second transmission time interval-level spreading information according to the replication factor, where the second transmission time interval-level spreading information is information obtained after transmission time interval-level spreading is performed on the second to-be-sent information according to the generated spreading sequence for transmission time interval-level spreading.

With reference to the seventh possible implementation manner of the second aspect, in a ninth possible implementation manner of the second aspect, the spreading sequence for frequency domain spreading is a ZC sequence or a Gray code.

According to a third aspect, user equipment, used in an M2M system, is provided, where the user equipment includes:

a first spreading factor acquiring module, configured to acquire a frequency domain spreading factor, a symbol-level spreading factor and a transmission time interval-level spreading factor;

a first spreading module, configured to perform frequency domain despreading, symbol-level despreading and transmission time interval-level despreading on first to-be-sent information respectively according to the frequency domain spreading factor, the symbol-level spreading factor and the transmission time interval-level spreading factor that are acquired by the first spreading factor acquiring module, to obtain first spread information;

a first information sending module, configured to send the first spread information acquired by the first spreading module to a base station;

a first information receiving module, configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and a first despreading module, configured to perform frequency domain despreading, symbol-level despreading and transmission time interval-level despreading on the second spread information received by the first information receiving module, respectively according to the frequency domain spreading factor, the symbol-level spreading factor and the transmission time interval-level spreading factor that are acquired by the first spreading factor acquiring module.

In a first possible implementation manner of the third aspect, the first spreading factor acquiring module includes:

a first spreading factor receiving unit, configured to receive the frequency domain spreading factor, the symbol-level spreading factor and the transmission time interval-level spreading factor that are sent by the base station;

a second spreading factor receiving unit, configured to receive some spreading factors that are of the frequency domain spreading factor, the symbol-level spreading factor and the transmission time interval-level spreading factor and are sent by the base station; and a first spreading factor acquiring unit, configured to acquire the prestored remaining spreading factors of the frequency domain spreading factor, the symbol-level spreading factor and the transmission time interval-level spreading factor.

With reference to the first possible implementation manner of the third aspect, in a second possible implementation manner of the third aspect, the first spreading factor receiving unit is configured to receive the frequency domain spreading factor, the symbol-level spreading factor and the transmission time interval-level spreading factor that are sent in a signaling manner by the base station; and the second spreading factor receiving unit is configured to receive some spreading factors that are of the frequency domain spreading factor, the symbol-level spreading factor and the transmission time interval-level spreading factor and are sent in a signaling manner by the base station, where the symbol-level spreading factor is sent in a physical-layer signaling manner by the base station, and the transmission time interval-level spreading factor is sent in a higher-layer signaling manner by the base station.

In a third possible implementation manner of the third aspect, the first spreading module includes:

a first sequence generating unit, configured to generate a spreading sequence for frequency domain spreading according to the frequency domain spreading factor acquired by the first spreading factor acquiring module;

a first spreading unit, configured to perform frequency domain spreading on the first to-be-sent information according to the spreading sequence for frequency domain spreading generated by the first sequence generating unit;

a second sequence generating unit, configured to generate a spreading sequence for symbol-level spreading according to the symbol-level spreading factor acquired by the first spreading factor acquiring module;

a second spreading unit, configured to perform symbol-level spreading on the first to-be-sent information according to the spreading sequence for symbol-level spreading generated by the second sequence generating unit;

a third sequence generating unit, configured to generate a spreading sequence for transmission time interval-level spreading according to the transmission time interval-level spreading factor acquired by the first spreading factor acquiring module; and a third spreading unit, configured to perform transmission time interval-level spreading on the first to-be-sent information according to the spreading sequence for transmission time interval-level spreading generated by the third sequence generating unit, where the spreading sequence for frequency domain spreading is a ZC sequence or a Gray code.

With reference to the third possible implementation manner of the third aspect, in a fourth possible implementation manner of the third aspect, the transmission time interval-level spreading factor includes an actual spreading factor and a replication factor;

the third sequence generating unit is configured to generate the spreading sequence for transmission time interval-level spreading according to the actual spreading factor; and the first spreading module further includes:

a first replication unit, configured to replicate first transmission time interval-level spreading information according to the replication factor, where the first transmission time interval-level spreading information is information obtained after the third spreading unit performs transmission time interval-level spreading on the first to-be-sent information according to the spreading sequence for transmission time interval-level spreading generated by the third sequence generating unit.

In a fifth possible implementation manner of the third aspect, the first despreading module includes:

a fourth sequence generating unit, configured to generate a spreading sequence for frequency domain spreading according to the frequency domain spreading factor acquired by the first spreading factor acquiring module;

a first despreading unit, configured to perform frequency domain despreading on the second spread information according to the spreading sequence for frequency domain spreading generated by the fourth sequence generating unit;

a fifth sequence generating unit, configured to generate a spreading sequence for symbol-level spreading according to the symbol-level spreading factor acquired by the first spreading factor acquiring module;

a second despreading unit, configured to perform symbol-level despreading on the second spread information according to the spreading sequence for symbol-level spreading generated by the fifth sequence generating unit;

a sixth sequence generating unit, configured to generate a spreading sequence for transmission time interval-level spreading according to the transmission time interval-level spreading factor acquired by the first spreading factor acquiring module; and a third despreading unit, configured to perform transmission time interval-level despreading on the second spread information according to the spreading sequence for transmission time interval-level spreading generated by the sixth sequence generating unit.

According to a fourth aspect, user equipment, used in an M2M system, is provided, where the user equipment includes: a processor, a transmitter and a receiver, where the processor is configured to acquire a frequency domain spreading factor, a symbol-level spreading factor and a transmission time interval-level spreading factor;

the processor is configured to perform frequency domain despreading, symbol-level despreading and transmission time interval-level despreading on first to-be-sent information respectively according to the acquired frequency domain spreading factor, symbol-level spreading factor and transmission time interval-level spreading factor, to obtain first spread information;

the processor is configured to control the transmitter to send the acquired first spread information to the base station;

the receiver is configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and the processor is configured to perform frequency domain despreading, symbol-level despreading and transmission time interval-level despreading on the second spread information received by the receiver, respectively according to the acquired frequency domain spreading factor, symbol-level spreading factor and transmission time interval-level spreading factor.

In a first possible implementation manner of the fourth aspect, the receiver is configured to receive the frequency domain spreading factor, the symbol-level spreading factor and the transmission time interval-level spreading factor that are sent by the base station;

the processor is configured to acquire the frequency domain spreading factor, the symbol-level spreading factor and the transmission time interval-level spreading factor that are sent by the base station and received by the receiver;

the receiver is configured to receive some spreading factors that are of the frequency domain spreading factor, the symbol-level spreading factor and the transmission time interval-level spreading factor and are sent by the base station;

the processor is configured to acquire some spreading factors that are of the frequency domain spreading factor, the symbol-level spreading factor and the transmission time interval-level spreading factor and are sent by the base station and received by the receiver; and the processor is further configured to acquire the prestored remaining spreading factors of the frequency domain spreading factor, the symbol-level spreading factor and the transmission time interval-level spreading factor.

With reference to the first possible implementation manner of the fourth aspect, in a second possible implementation manner of the fourth aspect, the receiver is configured to receive the frequency domain spreading factor, the symbol-level spreading factor and the transmission time interval-level spreading factor that are sent in a signaling manner by the base station; and the receiver is configured to receive some spreading factors that are of the frequency domain spreading factor, the symbol-level spreading factor and the transmission time interval-level spreading factor and are sent in a signaling manner by the base station, where the symbol-level spreading factor is sent in a physical-layer signaling manner by the base station, and the transmission time interval-level spreading factor is sent in a higher-layer signaling manner by the base station.

In a third possible implementation manner of the fourth aspect, the processor is configured to generate a spreading sequence for frequency domain spreading according to the acquired frequency domain spreading factor, and perform frequency domain spreading on the first to-be-sent information according to the generated spreading sequence for frequency domain spreading;

the processor is configured to generate a spreading sequence for symbol-level spreading according to the acquired symbol-level spreading factor, and perform symbol-level spreading on the first to-be-sent information according to the generated spreading sequence for symbol-level spreading; and the processor is configured to generate a spreading sequence for transmission time interval-level spreading according to the acquired transmission time interval-level spreading factor, and perform transmission time interval-level spreading on the first to-be-sent information according to the generated spreading sequence for transmission time interval-level spreading, where the spreading sequence for frequency domain spreading is a ZC sequence or a Gray code.

With reference to the third possible implementation manner of the fourth aspect, in a fourth possible implementation manner of the fourth aspect, the transmission time interval-level spreading factor includes an actual spreading factor and a replication factor;

the processor is configured to generate the spreading sequence for transmission time interval-level spreading according to the actual spreading factor; and the processor is further configured to replicate first transmission time interval-level spreading information according to the replication factor, where the first transmission time interval-level spreading information is information obtained after transmission time interval-level spreading is performed on the first to-be-sent information according to the generated spreading sequence for transmission time interval-level spreading.

In a fifth possible implementation manner of the fourth aspect, the processor is configured to generate a spreading sequence for frequency domain spreading according to the acquired frequency domain spreading factor, and perform frequency domain despreading on the second spread information according to the generated spreading sequence for frequency domain spreading;

the processor is configured to generate a spreading sequence for symbol-level spreading according to the acquired symbol-level spreading factor, and perform symbol-level despreading on the second spread information according to the generated spreading sequence for symbol-level spreading; and the processor is configured to generate a spreading sequence for transmission time interval-level spreading according to the acquired transmission time interval-level spreading factor, and perform transmission time interval-level despreading on the second spread information according to the generated spreading sequence for transmission time interval-level spreading.

According to a fifth aspect, a base station, used in an M2M system, is provided, where the base station includes:

a second spreading factor acquiring module, configured to acquire a frequency domain spreading factor, a symbol-level spreading factor and a transmission time interval-level spreading factor;

a spreading factor sending module, configured to send, to user equipment, all or some spreading factors of the frequency domain spreading factor, the symbol-level spreading factor and the transmission time interval-level spreading factor that are acquired by the second spreading factor acquiring module;

a second information receiving module, configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

a second despreading module, configured to perform frequency domain despreading, symbol-level despreading and transmission time interval-level despreading on the first spread information received by the second information receiving module, respectively according to the frequency domain spreading factor, the symbol-level spreading factor and the transmission time interval-level spreading factor that are acquired by the second spreading factor acquiring module;

a second spreading module, configured to perform frequency domain despreading, symbol-level despreading and transmission time interval-level despreading on second to-be-sent information respectively according to the frequency domain spreading factor, the symbol-level spreading factor and the transmission time interval-level spreading factor that are acquired by the second spreading factor acquiring module, to obtain second spread information; and a second information sending module, configured to send the second spread information obtained by the second spreading module to the user equipment.

In a first possible implementation manner of the fifth aspect, the second spreading factor acquiring module includes:

a first spreading factor determining unit, configured to determine the frequency domain spreading factor, the symbol-level spreading factor and the transmission time interval-level spreading factor according to a first predetermined spreading factor selection policy, where the first predetermined spreading factor selection policy includes correspondences between quality of a channel environment in which the user equipment is located and the frequency domain spreading factor, the symbol-level spreading factor and the transmission time interval-level spreading factor.

With reference to the first possible implementation manner of the fifth aspect, in a second possible implementation manner of the fifth aspect, the spreading factor sending module includes:

a first spreading factor sending unit, configured to send, to the user equipment and in a signaling manner, the frequency domain spreading factor, the symbol-level spreading factor and the transmission time interval-level spreading factor that are determined by the first spreading factor determining unit according to the first predetermined spreading factor selection policy, where the symbol-level spreading factor is sent in a physical-layer signaling manner, and the transmission time interval-level spreading factor is sent in a higher-layer signaling manner.

In a third possible implementation manner of the fifth aspect, the second spreading factor acquiring module includes:

a second spreading factor determining unit, configured to determine some spreading factors of the frequency domain spreading factor, the symbol-level spreading factor and the transmission time interval-level spreading factor according to a second predetermined spreading factor selection policy, where the second predetermined spreading factor selection policy includes a correspondence between quality of a channel environment in which the user equipment is located and the some spreading factors of the frequency domain spreading factor, the symbol-level spreading factor and the transmission time interval-level spreading factor; and a second spreading factor acquiring unit, configured to acquire the prestored remaining spreading factors of the frequency domain spreading factor, the symbol-level spreading factor and the transmission time interval-level spreading factor.

With reference to the third possible implementation manner of the fifth aspect, in a fourth possible implementation manner of the fifth aspect, the spreading factor sending module includes:

a second spreading factor sending unit, configured to send, to the user equipment and in a signaling manner, the some spreading factors that are of the frequency domain spreading factor, the symbol-level spreading factor and the transmission time interval-level spreading factor and are determined by the second spreading factor determining unit according to the second predetermined spreading factor selection policy, where the symbol-level spreading factor is sent in a physical-layer signaling manner, and the transmission time interval-level spreading factor is sent in a higher-layer signaling manner.

In a fifth possible implementation manner of the fifth aspect, the second despreading module includes:

a seventh sequence generating unit, configured to generate a spreading sequence for frequency domain spreading according to the frequency domain spreading factor acquired by the second spreading factor acquiring module;

a fourth despreading unit, configured to perform frequency domain despreading on the first spread information according to the spreading sequence for frequency domain spreading generated by the seventh sequence generating unit;

an eighth sequence generating unit, configured to generate a spreading sequence for symbol-level spreading according to the symbol-level spreading factor acquired by the second spreading factor acquiring module;

a fifth despreading unit, configured to perform symbol-level despreading on the first spread information according to the spreading sequence for symbol-level spreading generated by the eighth sequence generating unit;

a ninth sequence generating unit, configured to generate a spreading sequence for transmission time interval-level spreading according to the transmission time interval-level spreading factor acquired by the second spreading factor acquiring module; and a sixth despreading unit, configured to perform transmission time interval-level despreading on the first spread information according to the spreading sequence for transmission time interval-level spreading generated by the ninth sequence generating unit.

In a sixth possible implementation manner of the fifth aspect, the second spreading module includes:

a tenth sequence generating unit, configured to generate a spreading sequence for frequency domain spreading according to the frequency domain spreading factor acquired by the second spreading factor acquiring module;

a fourth spreading unit, configured to perform frequency domain spreading on the second to-be-sent information according to the spreading sequence for frequency domain spreading generated by the tenth sequence generating unit;

an eleventh sequence generating unit, configured to generate a spreading sequence for symbol-level spreading according to the symbol-level spreading factor acquired by the second spreading factor acquiring module;

a fifth spreading unit, configured to perform symbol-level spreading on the second to-be-sent information according to the spreading sequence for symbol-level spreading generated by the eleventh sequence generating unit;

a twelfth sequence generating unit, configured to generate a spreading sequence for transmission time interval-level spreading according to the transmission time interval-level spreading factor acquired by the second spreading factor acquiring module; and a sixth spreading unit, configured to perform transmission time interval-level spreading on the second to-be-sent information according to the spreading sequence for transmission time interval-level spreading generated by the twelfth sequence generating unit, where the spreading sequence for frequency domain spreading is a ZC sequence or a Gray code.

With reference to the sixth possible implementation manner of the fifth aspect, in a seventh possible implementation manner of the fifth aspect, the transmission time interval-level spreading factor includes an actual spreading factor and a replication factor;

the twelfth sequence generating unit is configured to generate the spreading sequence for transmission time interval-level spreading according to the actual spreading factor; and the second spreading module further includes:

a second replication unit, configured to replicate second transmission time interval-level spreading information according to the replication factor, where the second transmission time interval-level spreading information is information obtained after the sixth spreading unit performs transmission time interval-level spreading on the second to-be-sent information according to the spreading sequence for transmission time interval-level spreading generated by the twelfth sequence generating unit.

According to a sixth aspect, a base station, used in an M2M system, is provided, where the base station includes: a processor, a transmitter and a receiver, where the processor is configured to acquire a frequency domain spreading factor, a symbol-level spreading factor and a transmission time interval-level spreading factor;

the processor is configured to control the transmitter to send all or some spreading factors of the acquired frequency domain spreading factor, symbol-level spreading factor and transmission time interval-level spreading factor to user equipment;

the receiver is configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

the processor is configured to perform frequency domain despreading, symbol-level despreading and transmission time interval-level despreading on the first spread information received by the receiver, respectively according to the acquired frequency domain spreading factor, symbol-level spreading factor and transmission time interval-level spreading factor;

the processor is configured to perform frequency domain despreading, symbol-level despreading and transmission time interval-level despreading on second to-be-sent information respectively according to the acquired frequency domain spreading factor, symbol-level spreading factor and transmission time interval-level spreading factor, to obtain second spread information; and the processor is configured to control the transmitter to send the second spread information to the user equipment.

In a first possible implementation manner of the sixth aspect, the processor is configured to determine the frequency domain spreading factor, the symbol-level spreading factor and the transmission time interval-level spreading factor according to a first predetermined spreading factor selection policy, where the first predetermined spreading factor selection policy includes correspondences between quality of a channel environment in which the user equipment is located and the frequency domain spreading factor, the symbol-level spreading factor and the transmission time interval-level spreading factor.

With reference to the first possible implementation manner of the sixth aspect, in a second possible implementation manner of the sixth aspect, the processor is configured to control the transmitter to send, to the user equipment and in a signaling manner, the frequency domain spreading factor, the symbol-level spreading factor and the transmission time interval-level spreading factor that are determined according to the first predetermined spreading factor selection policy, where the symbol-level spreading factor is sent in a physical-layer signaling manner, and the transmission time interval-level spreading factor is sent in a higher-layer signaling manner.

In a third possible implementation manner of the sixth aspect, the processor is configured to determine some spreading factors of the frequency domain spreading factor, the symbol-level spreading factor and the transmission time interval-level spreading factor according to a second predetermined spreading factor selection policy, where the second predetermined spreading factor selection policy includes a correspondence between quality of a channel environment in which the user equipment is located and the some spreading factors of the frequency domain spreading factor, the symbol-level spreading factor and the transmission time interval-level spreading factor; and the processor is further configured to acquire the prestored remaining spreading factors of the frequency domain spreading factor, the symbol-level spreading factor and the transmission time interval-level spreading factor.

With reference to the third possible implementation manner of the sixth aspect, in a fourth possible implementation manner of the sixth aspect, the processor is configured to control the transmitter to send, to the user equipment and in a signaling manner, the some spreading factors that are of the frequency domain spreading factor, the symbol-level spreading factor and the transmission time interval-level spreading factor and are determined according to the second predetermined spreading factor selection policy, where the symbol-level spreading factor is sent in a physical-layer signaling manner, and the transmission time interval-level spreading factor is sent in a higher-layer signaling manner.

In a fifth possible implementation manner of the sixth aspect, the processor is configured to generate a spreading sequence for frequency domain spreading according to the acquired frequency domain spreading factor, and perform frequency domain despreading on the first spread information according to the generated spreading sequence for frequency domain spreading;

the processor is configured to generate a spreading sequence for symbol-level spreading according to the acquired symbol-level spreading factor, and perform symbol-level despreading on the first spread information according to the generated spreading sequence for symbol-level spreading; and the processor is configured to generate a spreading sequence for transmission time interval-level spreading according to the acquired transmission time interval-level spreading factor, and perform transmission time interval-level despreading on the first spread information according to the generated spreading sequence for transmission time interval-level spreading.

In a sixth possible implementation manner of the sixth aspect, the processor is configured to generate a spreading sequence for frequency domain spreading according to the acquired frequency domain spreading factor, and perform frequency domain spreading on the second to-be-sent information according to the generated spreading sequence for frequency domain spreading;

the processor is configured to generate a spreading sequence for symbol-level spreading according to the acquired symbol-level spreading factor, and perform symbol-level spreading on the second to-be-sent information according to the generated spreading sequence for symbol-level spreading; and the processor is configured to generate a spreading sequence for transmission time interval-level spreading according to the acquired transmission time interval-level spreading factor, and perform transmission time interval-level spreading on the second to-be-sent information according to the generated spreading sequence for transmission time interval-level spreading, where the spreading sequence for frequency domain spreading is a ZC sequence or a Gray code.

With reference to the sixth possible implementation manner of the sixth aspect, in a seventh possible implementation manner of the sixth aspect, the transmission time interval-level spreading factor includes an actual spreading factor and a replication factor;

the processor is configured to generate the spreading sequence for transmission time interval-level spreading according to the actual spreading factor; and the processor is further configured to replicate second transmission time interval-level spreading information according to the replication factor, where the second transmission time interval-level spreading information is information obtained after transmission time interval-level spreading is performed on the second to-be-sent information according to the generated spreading sequence for transmission time interval-level spreading.

According to a seventh aspect, a wireless communications system is provided, where the system includes:

the user equipment according to the foregoing third aspect and the base station according to the foregoing fifth aspect.

Beneficial effects of the technical solutions provided in the embodiments of the present disclosure are:

A frequency domain spreading factor, a symbol-level spreading factor and a transmission time interval-level spreading factor are acquired, and information is sent or received according to the acquired spreading factors, so that when information is sent, an effect of sending of to-be-sent information subjected to spreading is the same as an effect of simple repetitive sending of to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the technical solutions provided in the embodiments of the present disclosure solve problems in the prior art that when simple repetitive sending is performed in a frequency domain or time domain, sending efficiency is low, delay is relatively long, and interference between user equipments in a same frequency is relatively severe, and achieve an objective of improving system capacity and resource utilization.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
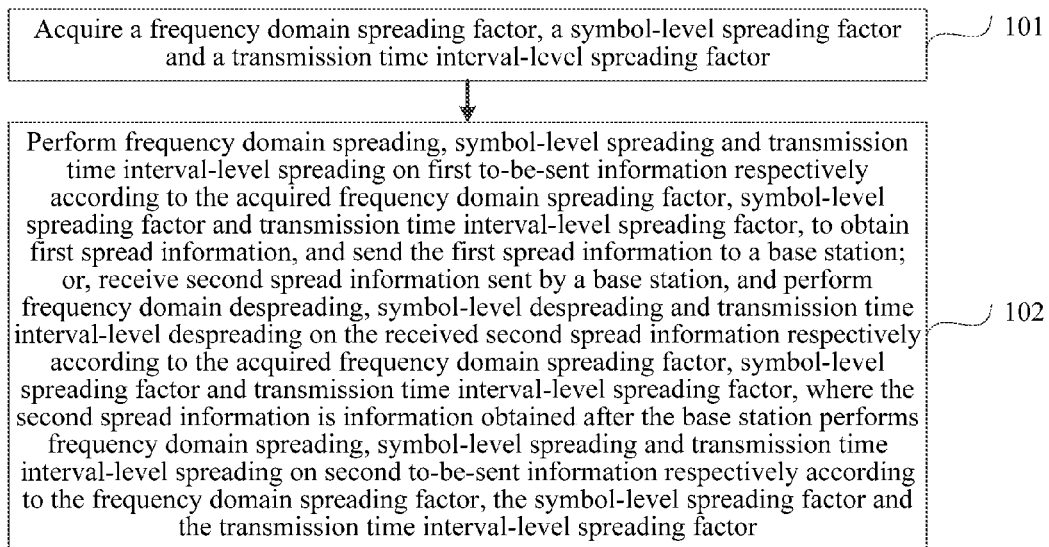
FIG. 1 is a method flowchart of a wireless communications method according to an embodiment of the present disclosure.

Refer to FIG. 1, which shows a method flowchart of a wireless communications method according to an embodiment of the present disclosure. This embodiment is mainly described by using an example in which the wireless communications method is applied to user equipment in an M2M system. The wireless communications method may include:

Step 101: Acquire a frequency domain spreading factor, a symbol-level spreading factor and a transmission time interval-level spreading factor.

Step 102: Perform frequency domain despreading, symbol-level despreading and transmission time interval-level despreading on first to-be-sent information respectively according to the acquired frequency domain spreading factor, symbol-level spreading factor and transmission time interval-level spreading factor, to obtain first spread information, and send the first spread information to a base station; or, receive second spread information sent by a base station, and perform frequency domain despreading, symbol-level despreading and transmission time interval-level despreading on the received second spread information respectively according to the acquired frequency domain spreading factor, symbol-level spreading factor and transmission time interval-level spreading factor, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor.

To sum up, in the wireless communications method provided in this embodiment of the present disclosure, a frequency domain spreading factor, a symbol-level spreading factor and a transmission time interval-level spreading factor are acquired, and information is sent or received according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the wireless communications method provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization while improving a coverage gain.

Figure 2:
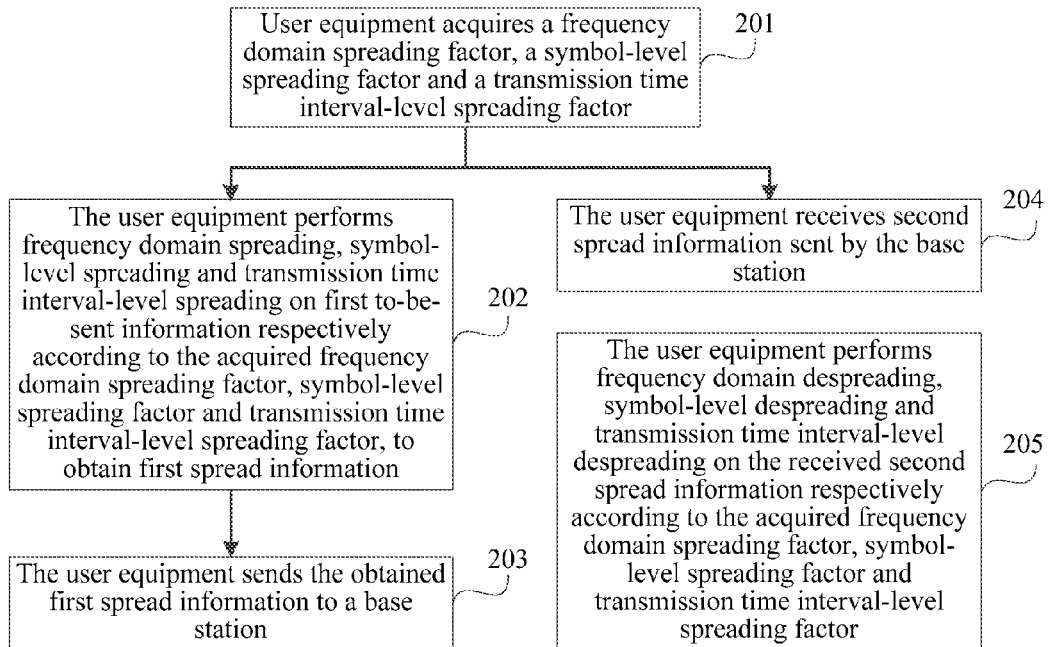
FIG. 2 is a method flowchart of a wireless communications method according to another embodiment of the present disclosure.

To further describe the wireless communications method shown in FIG. 1, refer to FIG. 2, which shows a method flowchart of a wireless communications method according to another embodiment of the present disclosure. This embodiment is mainly described by using an example in which the wireless communications method is applied to user equipment in an M2M system. The wireless communications method may include:

Step 201: User equipment acquires a frequency domain spreading factor, a symbol-level spreading factor and a transmission time interval-level spreading factor.

At least one of the frequency domain spreading factor, the symbol-level spreading factor and the transmission time interval-level spreading factor is a spreading factor sent by a base station. The spreading factor is an integer greater than or equal to 1.

The user equipment may receive the frequency domain spreading factor, the symbol-level spreading factor and the transmission time interval-level spreading factor that are sent by the base station;

or, the user equipment may receive some spreading factors that are of the frequency domain spreading factor, the symbol-level spreading factor and the transmission time interval-level spreading factor and are sent by the base station, and acquire the prestored remaining spreading factors of the frequency domain spreading factor, the symbol-level spreading factor and the transmission time interval-level spreading factor.

The frequency domain spreading factor, the symbol-level spreading factor and the transmission time interval-level spreading factor may be classified into variable spreading factors and invariable spreading factors, where the variable spreading factors are some spreading factors determined by the base station according to a predetermined spreading factor selection policy, and the invariable spreading factors are the remaining spreading factors preset by a system and stored in the user equipment and the base station.

Specifically, when the frequency domain spreading factor, the symbol-level spreading factor and the transmission time interval-level spreading factor are all variable spreading factors, the user equipment receives the frequency domain spreading factor, the symbol-level spreading factor and the transmission time interval-level spreading factor that are sent in a signaling manner by the base station; when some spreading factors of the frequency domain spreading factor, the symbol-level spreading factor and the transmission time interval-level spreading factor are variable spreading factors, the user equipment receives some spreading factors that are of the frequency domain spreading factor, the symbol-level spreading factor and the transmission time interval-level spreading factor and are sent in a signaling manner by the base station, and acquires the prestored remaining spreading factors of the frequency domain spreading factor, the symbol-level spreading factor and the transmission time interval-level spreading factor.

Different spreading factors may be sent by the base station by using different types of signaling. For example, the symbol-level spreading factor may be sent in a physical-layer signaling manner by the base station, and the transmission time interval-level spreading factor may be sent in a higher-layer signaling manner by the base station; or the symbol-level spreading factor may be sent in a higher-layer signaling manner, and the transmission time interval-level spreading factor may be sent in a physical-layer signaling manner.

Step 202: The user equipment performs frequency domain spreading, symbol-level spreading and transmission time interval-level spreading on first to-be-sent information respectively according to the acquired frequency domain spreading factor, symbol-level spreading factor and transmission time interval-level spreading factor, to obtain first spread information.

The user equipment may generate a spreading sequence for frequency domain spreading according to the acquired frequency domain spreading factor, and perform frequency domain spreading on the first to-be-sent information according to the generated spreading sequence for frequency domain spreading.

Specifically, by using an existing LTE system as an example, the user equipment generates a spreading sequence for frequency domain spreading according to the acquired frequency domain spreading factor, and assuming that the frequency domain spreading factor is $N_1$, the generated spreading sequence for frequency domain spreading is $c_1 = (c_1[0], c_1[1], \ldots, c_1[N-1])$. The user equipment may perform frequency domain spreading on the first to-be-sent information according to the following formula:

$$s_1(t) = \sum_{k=-\infty}^{+\infty} \sum_{n=0}^{N_1-1} a_1[k] c_1[n] p_s(t-kT_s) e^{j2\pi(f_0+n\Delta f)t} \quad \text{(formula 1)}$$

where $s_1(t)$ is information obtained after the first to-be-sent information is subjected to frequency domain spreading, $N_1$ is the frequency domain spreading factor, $a_1[k]$ is the $k^{th}$ data of the first to-be-sent information, $c_1[n]$ is the $n^{th}$ element in the spreading sequence for frequency domain spreading, $T_s$ is an input data symbol period, $$\Delta f = \frac{1}{T_s}$$

is a subcarrier interval, $f_0$ is a carrier frequency of the zeroth subcarrier, and $$p_s(t) = \begin{cases} 1 & 0 \leq t \leq T_s \\ 0 & \text{other} \end{cases}.$$

Meaning of the foregoing formula 1 is: data of the first to-be-sent information is repeated for $N_1$ times in a frequency domain, then multiplied by a corresponding spreading sequence, and then added together, thereby achieving a frequency domain spreading effect.

It should be noted that, the foregoing spreading sequence for frequency domain spreading may be a ZC (Zadoff-Chu) sequence or a Gray code.

The user equipment may generate a spreading sequence for symbol-level spreading according to the acquired symbol-level spreading factor, and perform symbol-level spreading on the first to-be-sent information according to the generated spreading sequence for symbol-level spreading.

Specifically, the user equipment generates a spreading sequence for symbol-level spreading according to the acquired symbol-level spreading factor, and assuming that the symbol-level spreading factor is $N_2$, the generated symbol-level spreading sequence is $c_2 = (c_2[0], c_2[1], \ldots, c_2[N-1])$. The user equipment may perform transmission time interval-level spreading on the first to-be-sent information according to the following formula:

$$s_2(t) = \sum_{n=0}^{N_2-1} s'_2(t) c_2[n] p_s(t-nT_s) \quad \text{(formula 2)}$$

where $s_2(t)$ is a signal obtained after the first to-be-sent information is subjected to symbol-level spreading, $N_2$ is the symbol-level spreading factor, $s'_2(t)$ is a signal of the first to-be-sent information, $c_2[n]$ is the $n^{th}$ element in the symbol-level spreading sequence, $T_s$ is an input data symbol period, and $$p_s(t) = \begin{cases} 1 & 0 \leq t \leq T_s \\ 0 & \text{other} \end{cases}.$$

Meaning of the foregoing formula 2 is: the symbol period is kept constant, each symbol is multiplied by a chip of a symbol-level spreading sequence, which is intuitively equivalent to that a symbol of to-be-sent information is repeated for $N_2$ times in a time domain and then multiplied by a corresponding symbol-level spreading sequence, achieving a symbol-level spreading effect.

The user equipment may generate a spreading sequence for transmission time interval-level spreading according to the acquired transmission time interval-level spreading factor, and perform transmission time interval-level spreading on the first to-be-sent information according to the generated spreading sequence for transmission time interval-level spreading.

Specifically, the user equipment generates a spreading sequence for transmission time interval-level spreading according to the acquired transmission time interval-level spreading factor, and assuming that the transmission time interval-level spreading factor is $N_3$, the generated transmission time interval-level spreading sequence is $c_3 = (c_3[0], c_3[1], \ldots, c_3[N-1])$. The user equipment may perform transmission time interval-level spreading on the first to-be-sent information according to the following formula:

$$s_3(t) = \sum_{n=0}^{N_3-1} s'_3(t) c_3[n] p_s(t-nT_{TTI}) \quad \text{(formula 3)}$$

where $s_3(t)$ is a signal obtained after the first to-be-sent information is subjected to transmission time interval-level spreading, $N_3$ is the transmission time interval-level spreading factor, $S'_3(t)$ is a signal of the first to-be-sent information, $C_3[n]$ is the $n^{th}$ element in the transmission time interval-level spreading sequence, $T_{TTI}$ is a transmission time interval of the first to-be-sent information, and $$p_s(t) = \begin{cases} 1 & 0 \leq t \leq T_s \\ 0 & \text{other} \end{cases}.$$

Meaning of the foregoing formula 3 is similar to that of the formula 2, but a transmission time interval is constant, a signal transmitted in each transmission time interval is repeated for $N_3$ times in a time domain and then multiplied by a corresponding transmission time interval-level spreading sequence, achieving a transmission time interval-level spreading effect.

It should be noted that, both the symbol-level spreading and the transmission time interval-level spreading belong to time domain spreading.

On an existing LTE condition, according to a method provided in the prior art, if a requirement of a scenario such as M2M needs to be satisfied, to achieve a coverage gain of 20 dB, to-be-sent information needs to be repetitively sent for approximately 100 times at most theoretically, and considering that the repetitive sending times need to be doubled or tripled for actual channel estimation, the to-be-sent information needs to be repetitively sent for 300 times at most. However, by using the solution provided in this embodiment of the present disclosure, assuming that the frequency domain spreading factor is 8, the symbol-level spreading factor is 12, and the transmission time interval-level spreading factor is 3, a total spreading gain is 8×12×3=288, which is equivalent to that to-be-sent information is repetitively sent for 288 times, and a maximum value required by the gain can be basically satisfied; if a channel environment in which some user equipments are located does not need such a large spreading gain, the base station may select a different symbol-level spreading factor and transmission time interval-level spreading factor according to the corresponding channel environment. For example, in a channel environment, according to the method provided in the prior art, as long as to-be-sent information is repetitively sent for 100 times, a coverage gain of 20 dB can be achieved; therefore, the base station may keep the frequency domain spreading factor of 8, and select the symbol-level spreading factor that is 13, and the transmission time interval-level spreading factor that is 1 (that is, transmission time interval-level spreading is not used), and in this case, a total spreading gain is 8×13×1=104.

In addition, a relatively large spreading factor causes a relatively long spreading time, and may cause a channel environment to change, thereby affecting orthogonality between spreading codes; therefore, a transmission time interval-level spreading sequence should not be excessively long. When an actually needed length of the transmission time interval-level spreading sequence is relatively large, transmission time interval-level spreading may be first performed according to a relatively short spreading sequence, and then information obtained by performing the spreading is replicated, so that an actually needed spreading effect can be achieved while ensuring that the orthogonality between the spreading codes is not affected.

Specifically, the transmission time interval-level spreading factor may include an actual spreading factor and a replication factor. The user equipment generates a transmission time interval-level spreading sequence according to the actual spreading factor, performs transmission time interval-level spreading on the first to-be-sent information according to the generated transmission time interval-level spreading sequence, to obtain first transmission time interval-level spreading information, and then replicates the obtained first transmission time interval-level spreading information according to the replication factor. For example, if the replication factor is $N_4$, the user equipment replicates the first transmission time interval-level spreading information for $N_4$ times. In an actual application, the user equipment may also replicate the first transmission time interval-level spreading information for $2N_4$, $3N_4$ or $4N_4$ times, which is not specifically limited in this embodiment of the present disclosure.

Specifically, for example, if the actually needed length of the transmission time interval-level spreading sequence is 100, and if the transmission time interval-level spreading sequence whose length is 100 is used, the channel environment may be caused to change, thereby affecting the orthogonality between the spreading codes, and in this case, the transmission time interval-level spreading factor may be set to 4×25, where 4 is the actual spreading factor, and 25 is the replication factor. The user equipment generates a transmission time interval-level spreading sequence whose length is 4 according to the actual spreading factor, performs transmission time interval-level spreading on the first to-be-sent information according to the generated transmission time interval-level spreading sequence whose length is 4, and then replicates first transmission time interval-level spreading information obtained after the transmission time interval-level spreading for 25 times.

Step 203: The user equipment sends the obtained first spread information to the base station.

The user equipment sends spread information obtained after frequency domain spreading, symbol-level spreading and transmission time interval-level spreading to the base station.

Step 204: The user equipment receives second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor.

Step 205: The user equipment performs frequency domain despreading, symbol-level despreading and transmission time interval-level despreading on the received second spread information respectively according to the acquired frequency domain spreading factor, symbol-level spreading factor and transmission time interval-level spreading factor.

The user equipment may generate a spreading sequence for frequency domain spreading according to the acquired frequency domain spreading factor, and perform frequency domain despreading on the second spread information according to the generated spreading sequence for frequency domain spreading; generate a spreading sequence for symbol-level spreading according to the acquired symbol-level spreading factor, and perform symbol-level despreading on the second spread information according to the generated spreading sequence for symbol-level spreading; and generate a spreading sequence for transmission time interval-level spreading according to the acquired transmission time interval-level spreading factor, and perform transmission time interval-level despreading on the second spread information according to the generated spreading sequence for transmission time interval-level spreading.

Specifically, when a system includes multiple user equipments, spreading sequences acquired by each user equipment are orthogonal to each other, and therefore, the user equipment may generate corresponding spreading sequence for frequency domain spreading, symbol-level spreading sequence and transmission time interval-level spreading sequence according to the acquired frequency domain spreading factor, symbol-level spreading factor and transmission time interval-level spreading factor, and multiply a signal received from the base station by the generated spreading sequence for frequency domain spreading, symbol-level spreading sequence and transmission time interval-level spreading sequence, to filter out information sent by the base station to another user equipment and obtain information sent by the base station to this user equipment.

After information is spread, interference between users can be eliminated by using a spreading sequence. Therefore, by using the foregoing wireless communications method, different user equipments can perform wireless communication with the base station at the same time by using all bandwidth of a system channel, thereby ensuring relatively high system capacity and resource utilization while improving a coverage gain.

To sum up, in the wireless communications method provided in this embodiment of the present disclosure, a frequency domain spreading factor, a symbol-level spreading factor and a transmission time interval-level spreading factor are acquired, and information is sent or received according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the wireless communications method provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization while improving a coverage gain. In addition, in the wireless communications method provided in this embodiment of the present disclosure, further, transmission time interval-level spreading is performed on to-be-sent information according to an actual spreading factor, and information obtained after the transmission time interval-level spreading is replicated according to a replication factor, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 3:
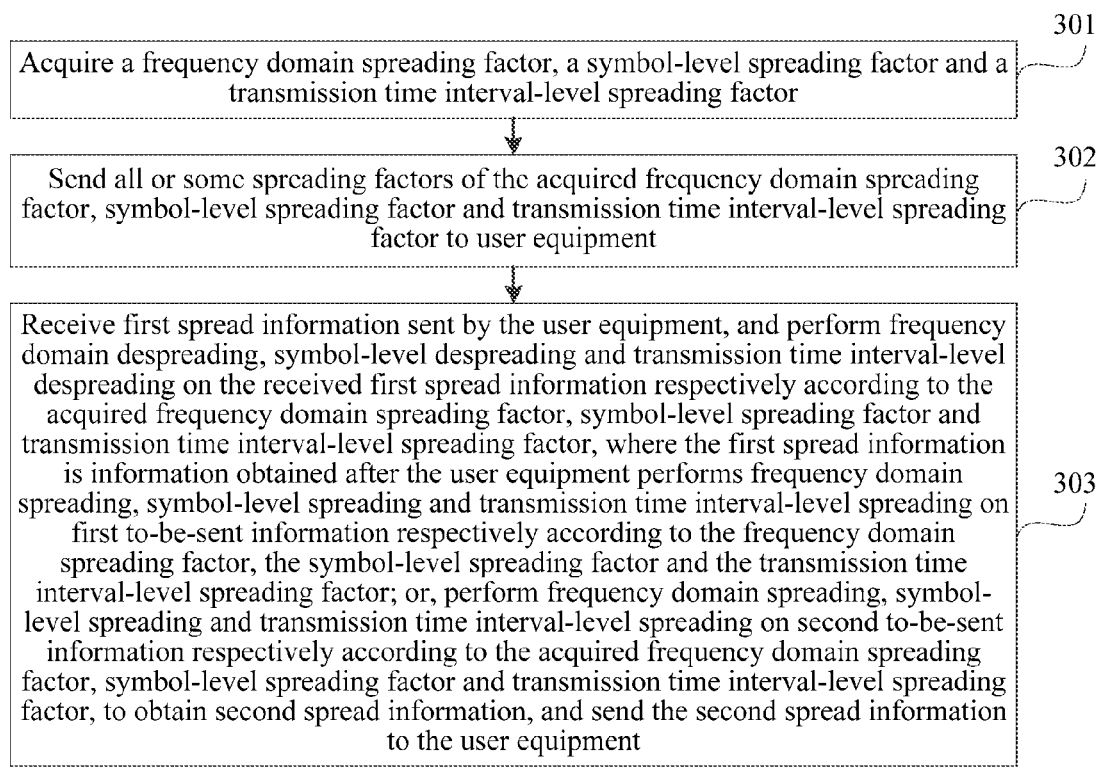
FIG. 3 is a method flowchart of a wireless communications method according to an embodiment of the present disclosure.

Refer to FIG. 3, which shows a method flowchart of a wireless communications method according to an embodiment of the present disclosure. This embodiment is mainly described by using an example in which the wireless communications method is applied to a base station in an M2M system, and the wireless communications method may include:

Step 301: Acquire a frequency domain spreading factor, a symbol-level spreading factor and a transmission time interval-level spreading factor.

Step 302: Send all or some spreading factors of the acquired frequency domain spreading factor, symbol-level spreading factor and transmission time interval-level spreading factor to user equipment.

Step 303: Receive first spread information sent by the user equipment, and perform frequency domain despreading, symbol-level despreading and transmission time interval-level despreading on the received first spread information respectively according to the acquired frequency domain spreading factor, symbol-level spreading factor and transmission time interval-level spreading factor, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor; or, perform frequency domain despreading, symbol-level despreading and transmission time interval-level despreading on second to-be-sent information respectively according to the acquired frequency domain spreading factor, symbol-level spreading factor and transmission time interval-level spreading factor, to obtain second spread information, and send the second spread information to the user equipment.

To sum up, in the wireless communications method provided in this embodiment of the present disclosure, a frequency domain spreading factor, a symbol-level spreading factor and a transmission time interval-level spreading factor are acquired, and information is received or sent according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the wireless communications method provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization while improving a coverage gain.

Figure 4:
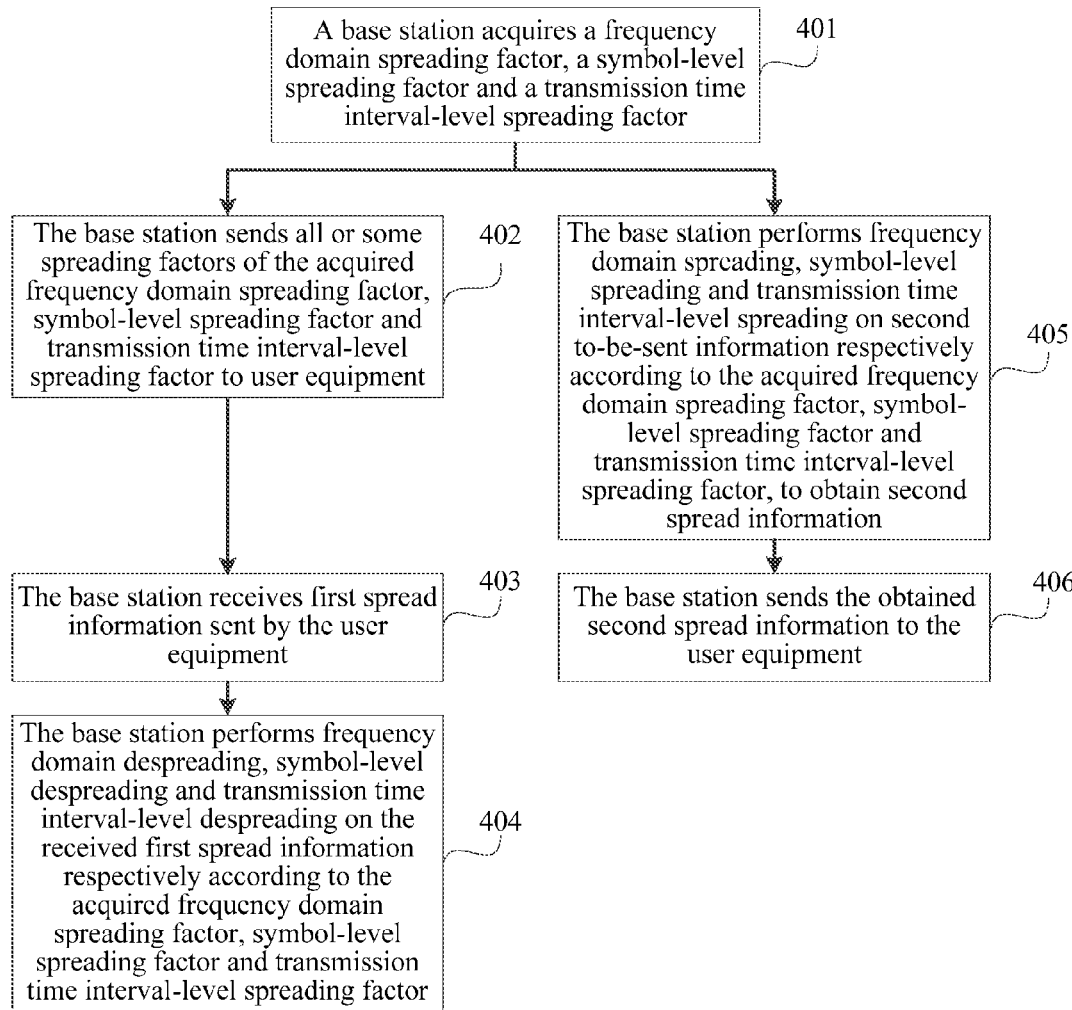
FIG. 4 is a method flowchart of a wireless communications method according to another embodiment of the present disclosure.

To further describe the wireless communications method shown in FIG. 3, refer to FIG. 4, which shows a method flowchart of a wireless communications method according to another embodiment of the present disclosure. This embodiment is mainly described by using an example in which the wireless communications method is applied to a base station in an M2M system, and the wireless communications method may include:

Step 401: A base station acquires a frequency domain spreading factor, a symbol-level spreading factor and a transmission time interval-level spreading factor.

The base station may determine the frequency domain spreading factor, the symbol-level spreading factor and the transmission time interval-level spreading factor according to a first predetermined spreading factor selection policy, where the first predetermined spreading factor selection policy includes correspondences between quality of a channel environment in which user equipment is located and the frequency domain spreading factor, the symbol-level spreading factor and the transmission time interval-level spreading factor.

Alternatively, the base station may determine some spreading factors of the frequency domain spreading factor, the symbol-level spreading factor and the transmission time interval-level spreading factor according to a second predetermined spreading factor selection policy, and acquire the prestored remaining spreading factors of the frequency domain spreading factor, the symbol-level spreading factor and the transmission time interval-level spreading factor, where the second predetermined spreading factor selection policy includes a correspondence between quality of a channel environment in which the user equipment is located and the some spreading factors of the frequency domain spreading factor, the symbol-level spreading factor and the transmission time interval-level spreading factor.

The spreading factor is an integer greater than or equal to 1. The frequency domain spreading factor, the symbol-level spreading factor and the transmission time interval-level spreading factor may be classified into variable spreading factors and invariable spreading factors, where the variable spreading factors are spreading factors determined by the base station according to a predetermined spreading factor selection policy, and the invariable spreading factors are spreading factors preset by a system and stored in the user equipment and the base station. For example, selection of the frequency domain spreading factor is generally related to a quantity of carriers or a quantity of resource blocks occupied when the user equipment sends information, and a quantity of carriers or a quantity of resource blocks of a channel on which the user equipment is located is relatively invariable, and therefore, a system may preset the frequency domain spreading factor to an invariable spreading factor, and store a value of the preset frequency domain spreading factor into the base station and the user equipment. However, selection of the symbol-level spreading factor and the transmission time interval-level spreading factor may be relatively flexible, the system may preset the symbol-level spreading factor and the transmission time interval-level spreading factor to variable spreading factors, and the base station may determine specific values of the symbol-level spreading factor and the transmission time interval-level spreading factor with reference to a predetermined spreading factor selection policy.

In addition, the predetermined spreading factor selection policy may include a correspondence between quality of a channel environment in which the user equipment is located and each spreading factor. If a quantity of repetitive sending times currently and actually needed by a piece of user equipment is relatively small, in this case if a relatively large spreading factor is adopted, waste of transmit power may be caused, and therefore, the base station may select an appropriate spreading factor according to the quality of the channel environment in which the user equipment is located. The quality of the channel environment in which the user equipment is located may be represented by using a CQI (channel quality indicator) value, and the CQI value may be obtained through calculation with reference to parameters such as an SNR (signal to noise ratio), an SINR (signal to interference plus noise ratio) and a transmission distance of a channel on which the user equipment is located.

Specifically, when the frequency domain spreading factor, the symbol-level spreading factor and the transmission time interval-level spreading factor are all variable spreading factors, the base station determines the frequency domain spreading factor, the symbol-level spreading factor and the transmission time interval-level spreading factor according to the first predetermined spreading factor selection policy; when some spreading factors of the frequency domain spreading factor, the symbol-level spreading factor and the transmission time interval-level spreading factor are variable spreading factors, the base station determines some spreading factors of the frequency domain spreading factor, the symbol-level spreading factor and the transmission time interval-level spreading factor according to the second predetermined spreading factor selection policy, and acquires the prestored remaining spreading factors of the frequency domain spreading factor, the symbol-level spreading factor and the transmission time interval-level spreading factor.

Step 402: The base station sends all or some spreading factors of the acquired frequency domain spreading factor, symbol-level spreading factor and transmission time interval-level spreading factor to user equipment.

Specifically, when the frequency domain spreading factor, the symbol-level spreading factor and the transmission time interval-level spreading factor are all variable spreading factors, the base station sends, to the user equipment and in a signaling manner, the frequency domain spreading factor, the symbol-level spreading factor and the transmission time interval-level spreading factor that are determined according to the first predetermined spreading factor selection policy.

When some spreading factors of the frequency domain spreading factor, the symbol-level spreading factor and the transmission time interval-level spreading factor are variable spreading factors, the base station sends, to the user equipment and in a signaling manner, the some spreading factors that are of the frequency domain spreading factor, the symbol-level spreading factor and the transmission time interval-level spreading factor and are determined according to the second predetermined spreading factor selection policy.

It should be noted that, the base station may send different spreading factors by using different types of signaling. For example, the base station may send, in a physical-layer signaling manner, the symbol-level spreading factor, and send, in a higher-layer signaling manner, the transmission time interval-level spreading factor; or, the base station may send, in a higher-layer signaling manner, the symbol-level spreading factor, and send, in a physical-layer signaling manner, the transmission time interval-level spreading factor.

Step 403: The base station receives first spread information sent by the user equipment.

The first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor. For a specific method for the user equipment to spread to-be-sent information, refer to step 202 corresponding to FIG. 2, which is not described again herein.

Step 404: The base station performs frequency domain despreading, symbol-level despreading and transmission time interval-level despreading on the received first spread information respectively according to the acquired frequency domain spreading factor, symbol-level spreading factor and transmission time interval-level spreading factor.

Specifically, the base station may generate a spreading sequence for frequency domain spreading according to the acquired frequency domain spreading factor, and perform frequency domain despreading on the first spread information according to the generated spreading sequence for frequency domain spreading;

the base station may generate a spreading sequence for symbol-level spreading according to the acquired symbol-level spreading factor, and perform symbol-level despreading on the first spread information according to the generated spreading sequence for symbol-level spreading; and the base station may generate a spreading sequence for transmission time interval-level spreading according to the acquired transmission time interval-level spreading factor, and perform transmission time interval-level despreading on the first spread information according to the generated spreading sequence for transmission time interval-level spreading.

A method for the base station to despread received information is similar to the foregoing despreading method on a user equipment side in step 205, which is not described again herein.

Step 405: The base station performs frequency domain spreading, symbol-level spreading and transmission time interval-level spreading on second to-be-sent information respectively according to the acquired frequency domain spreading factor, symbol-level spreading factor and transmission time interval-level spreading factor, to obtain second spread information.

Specifically, the base station may generate a spreading sequence for frequency domain spreading according to the acquired frequency domain spreading factor, and perform frequency domain spreading on the second to-be-sent information according to the generated spreading sequence for frequency domain spreading;

the base station may generate a spreading sequence for symbol-level spreading according to the acquired symbol-level spreading factor, and perform symbol-level spreading on the second to-be-sent information according to the generated spreading sequence for symbol-level spreading; and the base station may generate a spreading sequence for transmission time interval-level spreading according to the acquired transmission time interval-level spreading factor, and perform transmission time interval-level spreading on the second to-be-sent information according to the generated spreading sequence for transmission time interval-level spreading, where the spreading sequence for frequency domain spreading may be a ZC (Zadoff-Chu) sequence or a Gray code.

In addition, the transmission time interval-level spreading factor may include an actual spreading factor and a replication factor. The base station generates a transmission time interval-level spreading sequence according to the actual spreading factor, performs transmission time interval-level spreading on the second to-be-sent information according to the generated transmission time interval-level spreading sequence, to obtain second transmission time interval-level spreading information, and then replicates the obtained second transmission time interval-level spreading information according to the replication factor. For example, if the replication factor is $N_4$, the base station replicates the second transmission time interval-level spreading information for $N_4$ times. In an actual application, the base station may also replicate the second transmission time interval-level spreading information for $2N_4$, $3N_4$ or $4N_4$ times, which is not specifically limited in this embodiment of the present disclosure.

A specific method for the base station to spread to-be-sent information is the same as corresponding step 202 in FIG. 2, and for details, refer to formulas 1 to 3 in step 202, which are not described again herein.

Step 406: The base station sends the obtained second spread information to the user equipment.

Likewise, when a system includes multiple user equipments, spreading sequences acquired corresponding to each user equipment by the base station are orthogonal to each other, and therefore, the base station may generate a corresponding spreading sequence for frequency domain spreading, symbol-level spreading sequence and transmission time interval-level spreading sequence according to the frequency domain spreading factor, symbol-level spreading factor and transmission time interval-level spreading factor that are acquired corresponding to each user equipment, and multiply a received signal by the spreading sequence for frequency domain spreading, symbol-level spreading sequence and transmission time interval-level spreading sequence that are generated corresponding to each user equipment, to filter out information sent by the user equipment.

To sum up, in the wireless communications method provided in this embodiment of the present disclosure, a frequency domain spreading factor, a symbol-level spreading factor and a transmission time interval-level spreading factor are acquired, and information is received or sent according to the acquired frequency domain spreading factor, symbol-level spreading factor and transmission time interval-level spreading factor, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the wireless communications method provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization. In the wireless communications method provided in this embodiment of the present disclosure, further, an appropriate spreading factor is determined according to quality of a channel environment in which the user equipment is located, thereby achieving an objective of reducing transmit power when a quantity of repetitive data sending times actually needed by the user equipment is relatively small. In addition, in the wireless communications method provided in this embodiment of the present disclosure, further, transmission time interval-level spreading is performed on to-be-sent information according to an actual spreading factor, and information obtained after the transmission time interval-level spreading is replicated according to a replication factor, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 5:
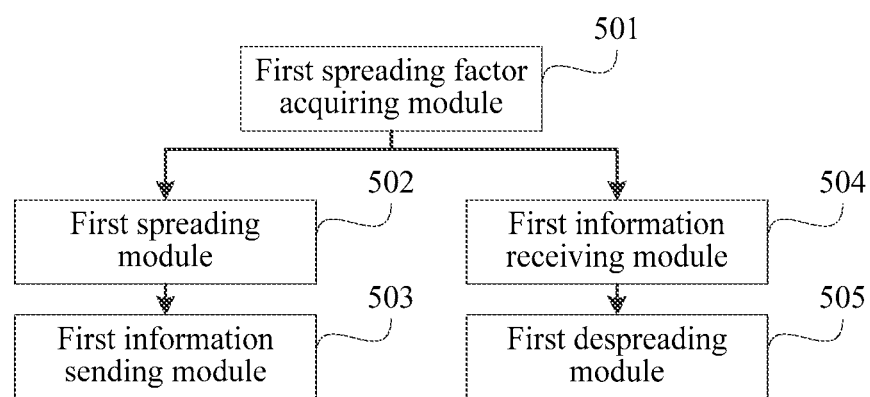
FIG. 5 is a device composition diagram of user equipment according to an embodiment of the present disclosure.

Corresponding to the wireless communications method shown in FIG. 1, refer to FIG. 5, which shows a device composition diagram of user equipment according to an embodiment of the present disclosure, where the user equipment is applied to an M2M system, and the user equipment may include:

a first spreading factor acquiring module 501, configured to acquire a frequency domain spreading factor, a symbol-level spreading factor and a transmission time interval-level spreading factor;

a first spreading module 502, configured to perform frequency domain despreading, symbol-level despreading and transmission time interval-level despreading on first to-be-sent information respectively according to the frequency domain spreading factor, the symbol-level spreading factor and the transmission time interval-level spreading factor that are acquired by the first spreading factor acquiring module 501, to obtain first spread information;

a first information sending module 503, configured to send the first spread information obtained by the first spreading module 502 to a base station;

a first information receiving module 504, configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and a first despreading module 505, configured to perform frequency domain despreading, symbol-level despreading and transmission time interval-level despreading on the second spread information received by the first information receiving module 504, respectively according to the frequency domain spreading factor, the symbol-level spreading factor and the transmission time interval-level spreading factor that are acquired by the first spreading factor acquiring module 501.

To sum up, the user equipment provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the user equipment provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization.

Figure 6:
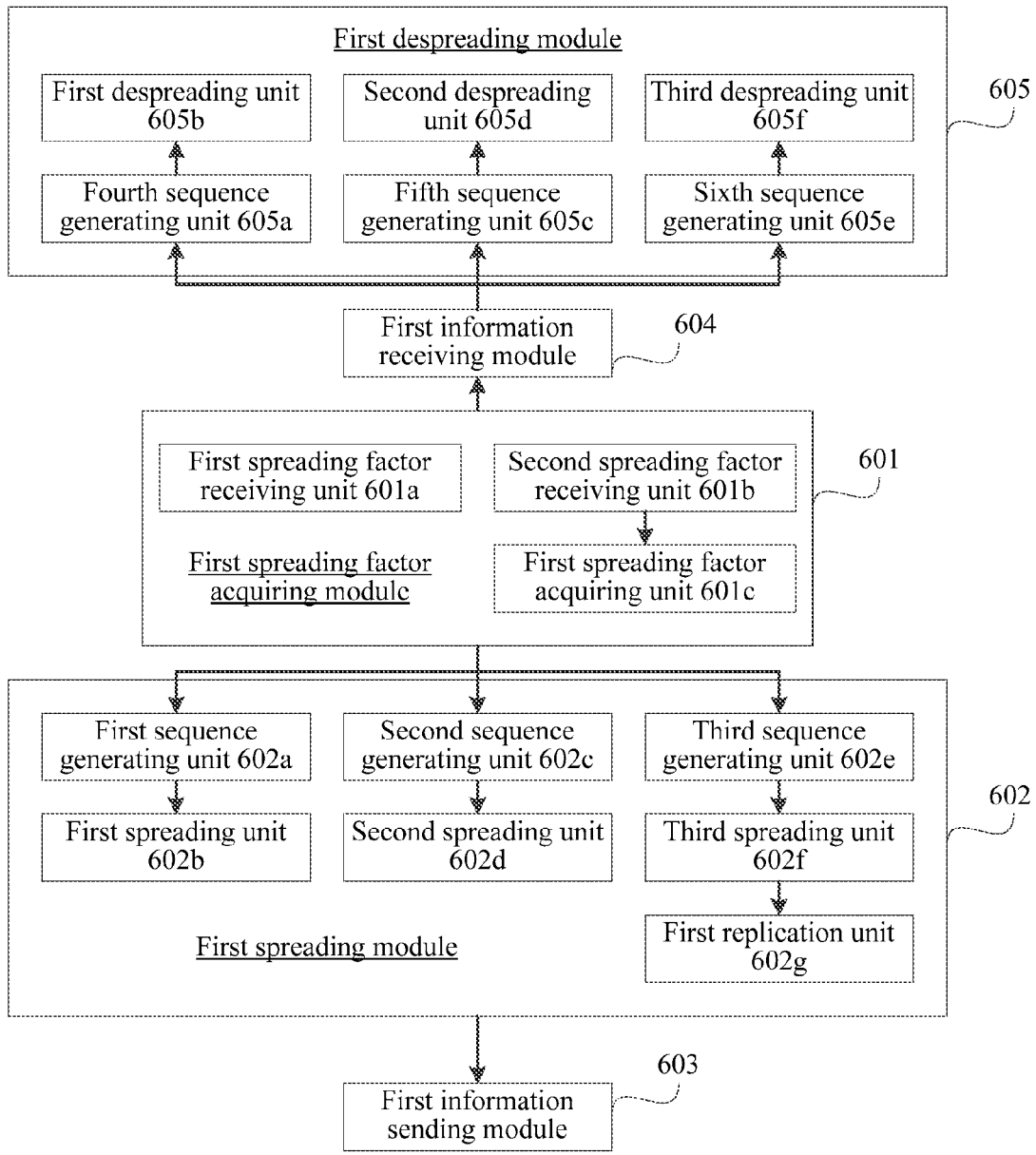
FIG. 6 is a device composition diagram of user equipment according to another embodiment of the present disclosure.

To further describe the user equipment shown in FIG. 5, refer to FIG. 6, which shows a device composition diagram of user equipment according to another embodiment of the present disclosure, where the user equipment is applied to an M2M system, and the user equipment may include:

a first spreading factor acquiring module 601, configured to acquire a frequency domain spreading factor, a symbol-level spreading factor and a transmission time interval-level spreading factor;

a first spreading module 602, configured to perform frequency domain despreading, symbol-level despreading and transmission time interval-level despreading on first to-be-sent information respectively according to the frequency domain spreading factor, the symbol-level spreading factor and the transmission time interval-level spreading factor that are acquired by the first spreading factor acquiring module 601, to obtain first spread information;

a first information sending module 603, configured to send the first spread information acquired by the first spreading module 602 to a base station;

a first information receiving module 604, configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and a first despreading module 605, configured to perform frequency domain despreading, symbol-level despreading and transmission time interval-level despreading on the second spread information received by the first information receiving module 604, respectively according to the frequency domain spreading factor, the symbol-level spreading factor and the transmission time interval-level spreading factor that are acquired by the first spreading factor acquiring module 601.

The first spreading factor acquiring module 601 includes:

a first spreading factor receiving unit 601a, configured to receive the frequency domain spreading factor, the symbol-level spreading factor and the transmission time interval-level spreading factor that are sent by the base station;

a second spreading factor receiving unit 601b, configured to receive some spreading factors that are of the frequency domain spreading factor, the symbol-level spreading factor and the transmission time interval-level spreading factor and are sent by the base station; and a first spreading factor acquiring unit 601c, configured to acquire the prestored remaining spreading factors of the frequency domain spreading factor, the symbol-level spreading factor and the transmission time interval-level spreading factor.

The first spreading factor receiving unit 601a is configured to receive the frequency domain spreading factor, the symbol-level spreading factor and the transmission time interval-level spreading factor that are sent in a signaling manner by the base station; and the second spreading factor receiving unit 601b is configured to receive some spreading factors that are of the frequency domain spreading factor, the symbol-level spreading factor and the transmission time interval-level spreading factor and are sent in a signaling manner by the base station, where the symbol-level spreading factor is sent in a physical-layer signaling manner by the base station, and the transmission time interval-level spreading factor is sent in a higher-layer signaling manner by the base station.

The first spreading module 602 includes:

a first sequence generating unit 602a, configured to generate a spreading sequence for frequency domain spreading according to the frequency domain spreading factor acquired by the first spreading factor acquiring module 601;

a first spreading unit 602b, configured to perform frequency domain spreading on the first to-be-sent information according to the spreading sequence for frequency domain spreading generated by the first sequence generating unit 602a;

a second sequence generating unit 602c, configured to generate a spreading sequence for symbol-level spreading according to the symbol-level spreading factor acquired by the first spreading factor acquiring module 601;

a second spreading unit 602d, configured to perform symbol-level spreading on the first to-be-sent information according to the spreading sequence for symbol-level spreading generated by the second sequence generating unit 602c;

a third sequence generating unit 602e, configured to generate a spreading sequence for transmission time interval-level spreading according to the transmission time interval-level spreading factor acquired by the first spreading factor acquiring module 601; and a third spreading unit 602f, configured to perform transmission time interval-level spreading on the first to-be-sent information according to the spreading sequence for transmission time interval-level spreading generated by the third sequence generating unit 602e, where the spreading sequence for frequency domain spreading is a ZC sequence or a Gray code.

The transmission time interval-level spreading factor includes an actual spreading factor and a replication factor;

the third sequence generating unit 602e is configured to generate the spreading sequence for transmission time interval-level spreading according to the actual spreading factor; and the first spreading module 602 further includes:

a first replication unit 602g, configured to replicate first transmission time interval-level spreading information according to the replication factor, where the first transmission time interval-level spreading information is information obtained after the third spreading unit 602f performs transmission time interval-level spreading on the first to-be-sent information according to the spreading sequence for transmission time interval-level spreading generated by the third sequence generating unit 602e.

The first despreading module 605 includes:

a fourth sequence generating unit 605a, configured to generate a spreading sequence for frequency domain spreading according to the frequency domain spreading factor acquired by the first spreading factor acquiring module 601;

a first despreading unit 605b, configured to perform frequency domain despreading on the second spread information according to the spreading sequence for frequency domain spreading generated by the fourth sequence generating unit 605a;

a fifth sequence generating unit 605c, configured to generate a spreading sequence for symbol-level spreading according to the symbol-level spreading factor acquired by the first spreading factor acquiring module 601;

a second despreading unit 605d, configured to perform symbol-level despreading on the second spread information according to the spreading sequence for symbol-level spreading generated by the fifth sequence generating unit 605c;

a sixth sequence generating unit 605e, configured to generate a spreading sequence for transmission time interval-level spreading according to the transmission time interval-level spreading factor acquired by the first spreading factor acquiring module 601; and a third despreading unit 605f, configured to perform transmission time interval-level despreading on the second spread information according to the spreading sequence for transmission time interval-level spreading generated by the sixth sequence generating unit 605e.

To sum up, the user equipment provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the user equipment provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization. In addition, the user equipment provided in this embodiment of the present disclosure further performs transmission time interval-level spreading on to-be-sent information according to an actual spreading factor, and replicates, according to a replication factor, information obtained after the transmission time interval-level spreading, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 7:
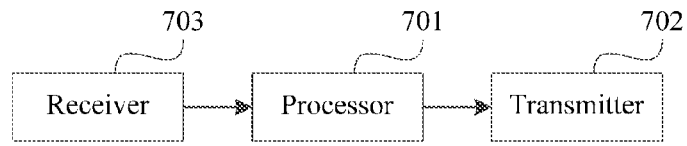
FIG. 7 is a device composition diagram of user equipment according to an embodiment of the present disclosure.

Corresponding to the wireless communications method shown in FIG. 1, refer to FIG. 7, which shows a device composition diagram of user equipment according to an embodiment of the present disclosure, where the user equipment is applied to an M2M system, and the user equipment may include: a processor 701, a transmitter 702 and a receiver 703;

the processor 701 is configured to acquire a frequency domain spreading factor, a symbol-level spreading factor and a transmission time interval-level spreading factor;

the processor 701 is configured to perform frequency domain despreading, symbol-level despreading and transmission time interval-level despreading on first to-be-sent information respectively according to the acquired frequency domain spreading factor, symbol-level spreading factor and transmission time interval-level spreading factor, to obtain first spread information;

the processor 701 is configured to control the transmitter 702 to send the acquired first spread information to a base station;

the receiver 703 is configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and the processor 701 is configured to perform frequency domain despreading, symbol-level despreading and transmission time interval-level despreading on the second spread information received by the receiver 703, respectively according to the acquired frequency domain spreading factor, symbol-level spreading factor and transmission time interval-level spreading factor.

To sum up, the user equipment provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the user equipment provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization.

Figure 8:
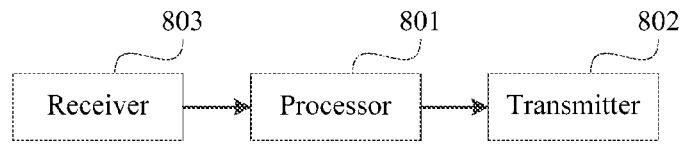
FIG. 8 is a device composition diagram of user equipment according to another embodiment of the present disclosure.

To further describe the user equipment shown in FIG. 7, refer to FIG. 8, which shows a device composition diagram of user equipment according to another embodiment of the present disclosure, where the user equipment is applied to an M2M scenario, and the user equipment may include: a processor 801, a transmitter 802 and a receiver 803;

the processor 801 is configured to acquire a frequency domain spreading factor, a symbol-level spreading factor and a transmission time interval-level spreading factor;

the processor 801 is configured to perform frequency domain despreading, symbol-level despreading and transmission time interval-level despreading on first to-be-sent information respectively according to the acquired frequency domain spreading factor, symbol-level spreading factor and transmission time interval-level spreading factor, to obtain first spread information;

the processor 801 is configured to control the transmitter 802 to send the acquired first spread information to a base station;

the receiver 803 is configured to receive second spread information sent by the base station, where the second spread information is information obtained after the base station performs frequency domain spreading, symbol-level spreading and transmission time interval-level spreading on second to-be-sent information respectively according to the frequency domain spreading factor, the symbol-level spreading factor and the transmission time interval-level spreading factor; and the processor 801 is configured to perform frequency domain despreading, symbol-level despreading and transmission time interval-level despreading on the second spread information received by the receiver 803, respectively according to the acquired frequency domain spreading factor, symbol-level spreading factor and transmission time interval-level spreading factor.

The receiver 803 is configured to receive the frequency domain spreading factor, the symbol-level spreading factor and the transmission time interval-level spreading factor that are sent by the base station;

the processor 801 is configured to acquire the frequency domain spreading factor, the symbol-level spreading factor and the transmission time interval-level spreading factor that are sent by the base station and received by the receiver 803;

the receiver 803 is configured to receive some spreading factors that are of the frequency domain spreading factor, the symbol-level spreading factor and the transmission time interval-level spreading factor and are sent by the base station;

the processor 801 is configured to acquire some spreading factors that are of the frequency domain spreading factor, the symbol-level spreading factor and the transmission time interval-level spreading factor and are sent by the base station and received by the receiver 803; and the processor 801 is further configured to acquire the prestored remaining spreading factors of the frequency domain spreading factor, the symbol-level spreading factor and the transmission time interval-level spreading factor.

The receiver 803 is configured to receive the frequency domain spreading factor, the symbol-level spreading factor and the transmission time interval-level spreading factor that are sent in a signaling manner by the base station; and the receiver 803 is configured to receive some spreading factors that are of the frequency domain spreading factor, the symbol-level spreading factor and the transmission time interval-level spreading factor and are sent in a signaling manner by the base station, where the symbol-level spreading factor is sent in a physical-layer signaling manner by the base station, and the transmission time interval-level spreading factor is sent in a higher-layer signaling manner by the base station.

The processor 801 is configured to generate a spreading sequence for frequency domain spreading according to the acquired frequency domain spreading factor, and perform frequency domain spreading on the first to-be-sent information according to the generated spreading sequence for frequency domain spreading;

the processor 801 is configured to generate a spreading sequence for symbol-level spreading according to the acquired symbol-level spreading factor, and perform symbol-level spreading on the first to-be-sent information according to the generated spreading sequence for symbol-level spreading; and the processor 801 is configured to generate a spreading sequence for transmission time interval-level spreading according to the acquired transmission time interval-level spreading factor, and perform transmission time interval-level spreading on the first to-be-sent information according to the generated spreading sequence for transmission time interval-level spreading, where the spreading sequence for frequency domain spreading is a ZC sequence or a Gray code.

The transmission time interval-level spreading factor includes an actual spreading factor and a replication factor;

the processor 801 is configured to generate the spreading sequence for transmission time interval-level spreading according to the actual spreading factor; and the processor 801 is further configured to replicate first transmission time interval-level spreading information according to the replication factor, where the first transmission time interval-level spreading information is information obtained after transmission time interval-level spreading is performed on the first to-be-sent information according to the generated spreading sequence for transmission time interval-level spreading.

The processor 801 is configured to generate a spreading sequence for frequency domain spreading according to the acquired frequency domain spreading factor, and perform frequency domain despreading on the second spread information according to the generated spreading sequence for frequency domain spreading;

the processor 801 is configured to generate a spreading sequence for symbol-level spreading according to the acquired symbol-level spreading factor, and perform symbol-level despreading on the second spread information according to the generated spreading sequence for symbol-level spreading; and the processor 801 is configured to generate a spreading sequence for transmission time interval-level spreading according to the acquired transmission time interval-level spreading factor, and perform transmission time interval-level despreading on the second spread information according to the generated spreading sequence for transmission time interval-level spreading.

To sum up, the user equipment provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the user equipment provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with a base station by using a same physical channel at the same time, thereby achieving an objective of improving system capacity and resource utilization. In addition, the user equipment provided in this embodiment of the present disclosure further performs transmission time interval-level spreading on to-be-sent information according to an actual spreading factor, and replicates, according to a replication factor, information obtained after the transmission time interval-level spreading, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 9:
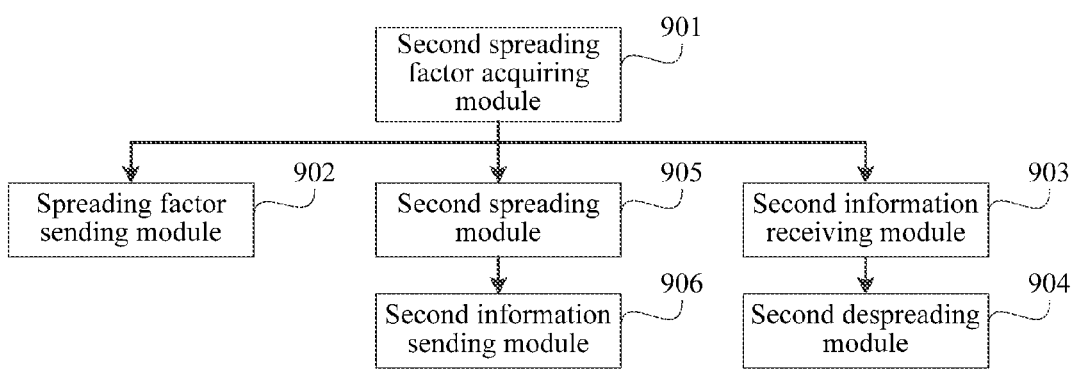
FIG. 9 is a device composition diagram of a base station according to an embodiment of the present disclosure.

Corresponding to the wireless communications method shown in FIG. 3, refer to FIG. 9, which shows a device composition diagram of a base station according to an embodiment of the present disclosure, where the base station is applied to an M2M system, and the base station may include:

a second spreading factor acquiring module 901, configured to acquire a frequency domain spreading factor, a symbol-level spreading factor and a transmission time interval-level spreading factor;

a spreading factor sending module 902, configured to send all or some spreading factors of the frequency domain spreading factor, the symbol-level spreading factor and the transmission time interval-level spreading factor that are acquired by the second spreading factor acquiring module 901 to user equipment;

a second information receiving module 903, configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

a second despreading module 904, configured to perform frequency domain despreading, symbol-level despreading and transmission time interval-level despreading on the first spread information received by the second information receiving module 903, respectively according to the frequency domain spreading factor, the symbol-level spreading factor and the transmission time interval-level spreading factor that are acquired by the second spreading factor acquiring module 901;

a second spreading module 905, configured to perform frequency domain despreading, symbol-level despreading and transmission time interval-level despreading on second to-be-sent information respectively according to the frequency domain spreading factor, the symbol-level spreading factor and the transmission time interval-level spreading factor that are acquired by the second spreading factor acquiring module 901, to obtain second spread information; and a second information sending module 906, configured to send the second spread information obtained by the second spreading module 905 to the user equipment.

To sum up, the base station provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the base station provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with the base station by using a same physical channel at the same time, thereby achieving an objective of improving system capacity and resource utilization.

Figure 10:
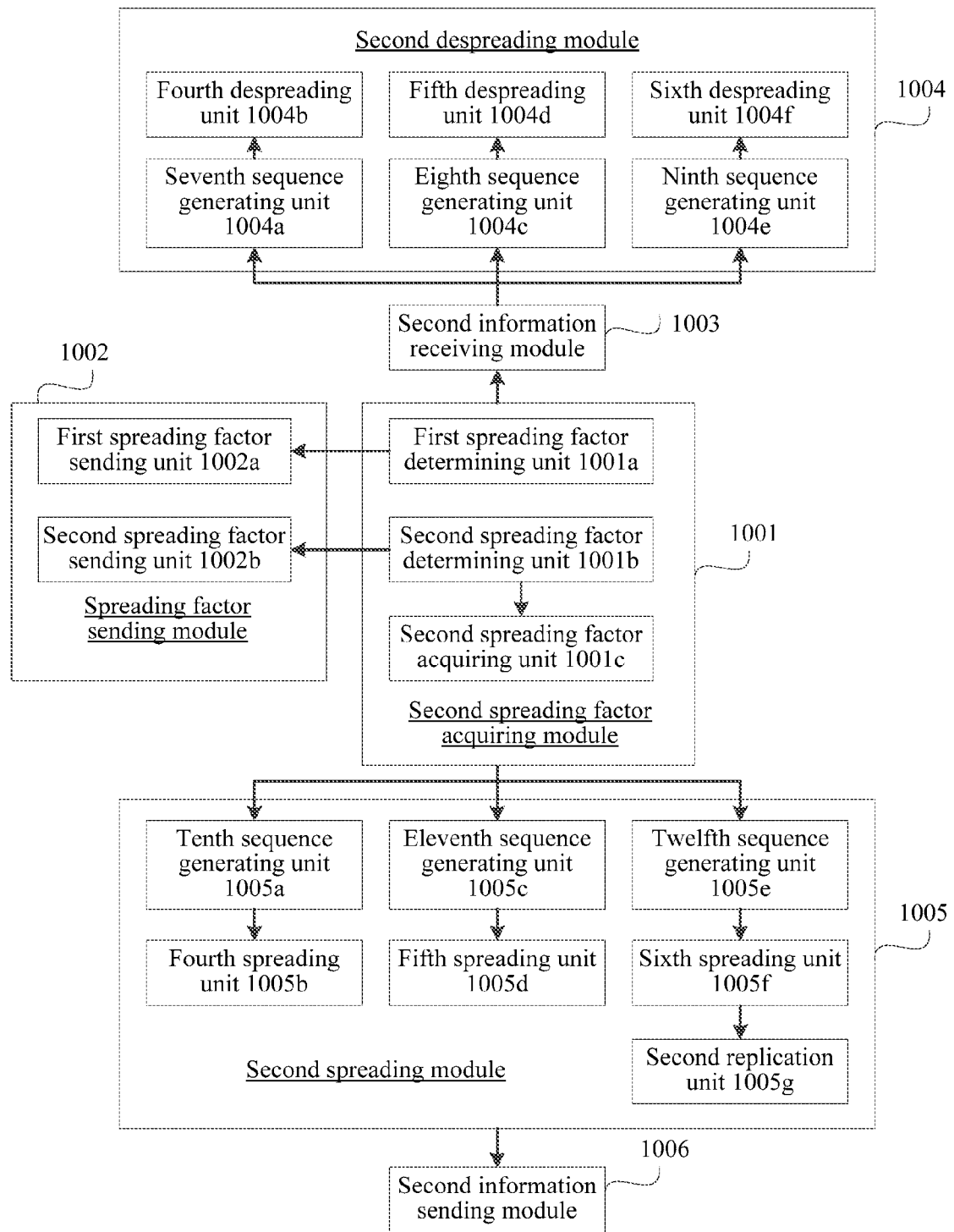
FIG. 10 is a device composition diagram of a base station according to another embodiment of the present disclosure.

To further describe the base station shown in FIG. 9, refer to FIG. 10, which shows a device composition diagram of a base station according to another embodiment of the present disclosure, where the base station is applied to an M2M scenario, and the base station may include:

a second spreading factor acquiring module 1001, configured to acquire a frequency domain spreading factor, a symbol-level spreading factor and a transmission time interval-level spreading factor;

a spreading factor sending module 1002, configured to send at least one spreading factor of the frequency domain spreading factor, the symbol-level spreading factor and the transmission time interval-level spreading factor that are acquired by the second spreading factor acquiring module 1001 to user equipment;

a second information receiving module 1003, configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

a second despreading module 1004, configured to perform frequency domain despreading, symbol-level despreading and transmission time interval-level despreading on the first spread information received by the second information receiving module 1003, respectively according to the frequency domain spreading factor, the symbol-level spreading factor and the transmission time interval-level spreading factor that are acquired by the second spreading factor acquiring module 1001;

a second spreading module 1005, configured to perform frequency domain despreading, symbol-level despreading and transmission time interval-level despreading on second to-be-sent information respectively according to the frequency domain spreading factor, the symbol-level spreading factor and the transmission time interval-level spreading factor that are acquired by the second spreading factor acquiring module 1001, to obtain second spread information; and a second information sending module 1006, configured to send the second spread information obtained by the second spreading module 1005 to the user equipment.

The second spreading factor acquiring module 1001 includes:

a first spreading factor determining unit 1001*a*, configured to determine the frequency domain spreading factor, the symbol-level spreading factor and the transmission time interval-level spreading factor according to a first predetermined spreading factor selection policy, where the first predetermined spreading factor selection policy includes correspondences between quality of a channel environment in which the user equipment is located and the frequency domain spreading factor, the symbol-level spreading factor and the transmission time interval-level spreading factor.

The spreading factor sending module 1002 includes:

a first spreading factor sending unit 1002*a*, configured to send, to the user equipment and in a signaling manner, the frequency domain spreading factor, the symbol-level spreading factor and the transmission time interval-level spreading factor that are determined by the first spreading factor determining unit 1001*a* according to the first predetermined spreading factor selection policy, where the symbol-level spreading factor is sent in a physical-layer signaling manner, and the transmission time interval-level spreading factor is sent in a higher-layer signaling manner.

The second spreading factor acquiring module 1001 includes:

a second spreading factor determining unit 1001*b*, configured to determine some spreading factors of the frequency domain spreading factor, the symbol-level spreading factor and the transmission time interval-level spreading factor according to a second predetermined spreading factor selection policy, where the second predetermined spreading factor selection policy includes a correspondence between quality of a channel environment in which the user equipment is located and the some spreading factors of the frequency domain spreading factor, the symbol-level spreading factor and the transmission time interval-level spreading factor; and a second spreading factor acquiring unit 1001*c*, configured to acquire the prestored remaining spreading factors of the frequency domain spreading factor, the symbol-level spreading factor and the transmission time interval-level spreading factor.

The spreading factor sending module 1002 includes:

a second spreading factor sending unit 1002*b*, configured to send, to the user equipment and in a signaling manner, the some spreading factors that are of the frequency domain spreading factor, the symbol-level spreading factor and the transmission time interval-level spreading factor and are determined by the second spreading factor determining unit 1001*b* according to the second predetermined spreading factor selection policy, where the symbol-level spreading factor is sent in a physical-layer signaling manner, and the transmission time interval-level spreading factor is sent in a higher-layer signaling manner.

The second despreading module 1004 includes:

a seventh sequence generating unit 1004*a*, configured to generate a spreading sequence for frequency domain spreading according to the frequency domain spreading factor acquired by the second spreading factor acquiring module 1001;

a fourth despreading unit 1004*b*, configured to perform frequency domain despreading on the first spread information according to the spreading sequence for frequency domain spreading generated by the seventh sequence generating unit 1004*a*;

an eighth sequence generating unit 1004*c*, configured to generate a spreading sequence for symbol-level spreading according to the symbol-level spreading factor acquired by the second spreading factor acquiring module 1001;

a fifth despreading unit 1004*d*, configured to perform symbol-level despreading on the first spread information according to the spreading sequence for symbol-level spreading generated by the eighth sequence generating unit 1004*c*;

a ninth sequence generating unit 1004*e*, configured to generate a spreading sequence for transmission time interval-level spreading according to the transmission time interval-level spreading factor acquired by the second spreading factor acquiring module 1001; and a sixth despreading unit 1004*f*, configured to perform transmission time interval-level despreading on the first spread information according to the spreading sequence for transmission time interval-level spreading generated by the ninth sequence generating unit 1004*e*.

The second spreading module 1005 includes:

a tenth sequence generating unit 1005*a*, configured to generate a spreading sequence for frequency domain spreading according to the frequency domain spreading factor acquired by the second spreading factor acquiring module 1001;

a fourth spreading unit 1005*b*, configured to perform frequency domain spreading on the second to-be-sent information according to the spreading sequence for frequency domain spreading generated by the tenth sequence generating unit 1005*a*;

an eleventh sequence generating unit 1005*c*, configured to generate a spreading sequence for symbol-level spreading according to the symbol-level spreading factor acquired by the second spreading factor acquiring module 1001;

a fifth spreading unit 1005*d*, configured to perform symbol-level spreading on the second to-be-sent information according to the spreading sequence for symbol-level spreading generated by the eleventh sequence generating unit 1005*c*;

a twelfth sequence generating unit 1005*e*, configured to generate a spreading sequence for transmission time interval-level spreading according to the transmission time interval-level spreading factor acquired by the second spreading factor acquiring module 1001; and a sixth spreading unit 1005*f*, configured to perform transmission time interval-level spreading on the second to-besent information according to the spreading sequence for transmission time interval-level spreading generated by the twelfth sequence generating unit 1005e, where the spreading sequence for frequency domain spreading is a ZC sequence or a Gray code.

The transmission time interval-level spreading factor may further include an actual spreading factor and a replication factor;

the twelfth sequence generating unit 1005e is configured to generate the spreading sequence for transmission time interval-level spreading according to the actual spreading factor; and the second spreading module 1005 further includes:

a second replication unit 1005g, configured to replicate second transmission time interval-level spreading information according to the replication factor, where the second transmission time interval-level spreading information is information obtained after the sixth spreading unit 1005f performs transmission time interval-level spreading on the second to-be-sent information according to the spreading sequence for transmission time interval-level spreading generated by the twelfth sequence generating unit 1005e.

To sum up, the base station provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the base station provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with the base station by using a same physical channel at the same time, thereby achieving an objective of improving system capacity and resource utilization. The base station provided in this embodiment of the present disclosure further determines an appropriate spreading factor according to a predetermined spreading factor selection policy, thereby achieving an objective of reducing transmit power when a quantity of repetitive data sending times actually needed by the user equipment is relatively small. In addition, the base station provided in this embodiment of the present disclosure further performs transmission time interval-level spreading on to-be-sent information according to an actual spreading factor, and replicates, according to a replication factor, information obtained after the transmission time interval-level spreading, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 11:
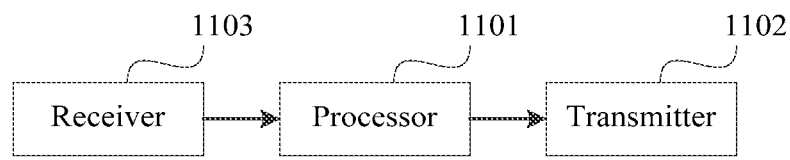
FIG. 11 is a device composition diagram of a base station according to an embodiment of the present disclosure.

Corresponding to the wireless communications method shown in FIG. 3, refer to FIG. 11, which shows a device composition diagram of a base station according to an embodiment of the present disclosure, where the base station is applied to an M2M system, and the base station may include: a processor 1101, a transmitter 1102 and a receiver 1103;

the processor 1101 is configured to acquire a frequency domain spreading factor, a symbol-level spreading factor and a transmission time interval-level spreading factor;

the processor 1101 is configured to control the transmitter 1102 to send all or some spreading factors of the acquired frequency domain spreading factor, symbol-level spreading factor and transmission time interval-level spreading factor to user equipment;

the receiver 1103 is configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

the processor 1101 is configured to perform frequency domain despreading, symbol-level despreading and transmission time interval-level despreading on the first spread information received by the receiver 1103, respectively according to the acquired frequency domain spreading factor, symbol-level spreading factor and transmission time interval-level spreading factor;

the processor 1101 is configured to perform frequency domain despreading, symbol-level despreading and transmission time interval-level despreading on second to-be-sent information respectively according to the acquired frequency domain spreading factor, symbol-level spreading factor and transmission time interval-level spreading factor, to obtain second spread information; and the processor 1101 is configured to control the transmitter 1102 to send the second spread information to the user equipment.

To sum up, the base station provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the base station provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with the base station by using a same physical channel at the same time, thereby achieving an objective of improving system capacity and resource utilization.

Figure 12:
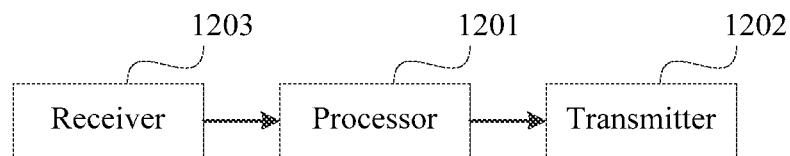
FIG. 12 is a device composition diagram of a base station according to another embodiment of the present disclosure.

To further describe the base station shown in FIG. 11, refer to FIG. 12, which shows a device composition diagram of a base station according to another embodiment of the present disclosure, where the base station is applied to an M2M system, and the base station may include: a processor 1201, a transmitter 1202 and a receiver 1203;

the processor 1201 is configured to acquire a frequency domain spreading factor, a symbol-level spreading factor and a transmission time interval-level spreading factor;

the processor 1201 is configured to control the transmitter 1202 to send all or some spreading factors of the acquired frequency domain spreading factor, symbol-level spreading factor and transmission time interval-level spreading factor to user equipment;

the receiver 1203 is configured to receive first spread information sent by the user equipment, where the first spread information is information obtained after the user equipment performs frequency domain spreading, symbol-level spreading and transmission time interval-level spreading on first to-be-sent information respectively according to the frequency domain spreading factor, the symbol-level spreading factor and the transmission time interval-level spreading factor;

the processor 1201 is configured to perform frequency domain despreading, symbol-level despreading and transmission time interval-level despreading on the first spread information received by the receiver 1203, respectively according to the frequency domain spreading factor, the symbol-level spreading factor and the transmission time interval-level spreading factor that are acquired by the processor 1201;

the processor 1201 is configured to perform frequency domain despreading, symbol-level despreading and transmission time interval-level despreading on second to-be-sent information respectively according to the acquired frequency domain spreading factor, symbol-level spreading factor and transmission time interval-level spreading factor, to obtain second spread information; and the processor 1201 is configured to control the transmitter 1202 to send the second spread information to the user equipment.

The processor 1201 is configured to determine the frequency domain spreading factor, the symbol-level spreading factor and the transmission time interval-level spreading factor according to a first predetermined spreading factor selection policy, where the first predetermined spreading factor selection policy includes correspondences between quality of a channel environment in which the user equipment is located and the frequency domain spreading factor, the symbol-level spreading factor and the transmission time interval-level spreading factor.

The processor 1201 is configured to control the transmitter 1202 to send, to the user equipment and in a signaling manner, the frequency domain spreading factor, the symbol-level spreading factor and the transmission time interval-level spreading factor that are determined according to the first predetermined spreading factor selection policy, where the symbol-level spreading factor is sent in a physical-layer signaling manner, and the transmission time interval-level spreading factor is sent in a higher-layer signaling manner.

The processor 1201 is configured to determine some spreading factors of the frequency domain spreading factor, the symbol-level spreading factor and the transmission time interval-level spreading factor according to a second predetermined spreading factor selection policy, where the second predetermined spreading factor selection policy includes a correspondence between quality of a channel environment in which the user equipment is located and the some spreading factors of the frequency domain spreading factor, the symbol-level spreading factor and the transmission time interval-level spreading factor; and the processor 1201 is further configured to acquire the prestored remaining spreading factors of the frequency domain spreading factor, the symbol-level spreading factor and the transmission time interval-level spreading factor.

The processor 1201 is configured to control the transmitter 1202 to send, to the user equipment and in a signaling manner, the some spreading factors that are of the frequency domain spreading factor, the symbol-level spreading factor and the transmission time interval-level spreading factor and are determined according to the second predetermined spreading factor selection policy, where the symbol-level spreading factor is sent in a physical-layer signaling manner, and the transmission time interval-level spreading factor is sent in a higher-layer signaling manner.

The processor 1201 is configured to generate a spreading sequence for frequency domain spreading according to the acquired frequency domain spreading factor, and perform frequency domain despreading on the first spread information according to the generated spreading sequence for frequency domain spreading;

the processor 1201 is configured to generate a spreading sequence for symbol-level spreading according to the acquired symbol-level spreading factor, and perform symbol-level despreading on the first spread information according to the generated spreading sequence for symbol-level spreading; and the processor 1201 is configured to generate a spreading sequence for transmission time interval-level spreading according to the acquired transmission time interval-level spreading factor, and perform transmission time interval-level despreading on the received first spread information according to the generated spreading sequence for transmission time interval-level spreading.

The processor 1201 is configured to generate a spreading sequence for frequency domain spreading according to the acquired frequency domain spreading factor, and perform frequency domain spreading on the second to-be-sent information according to the generated spreading sequence for frequency domain spreading;

the processor 1201 is configured to generate a spreading sequence for symbol-level spreading according to the acquired symbol-level spreading factor, and perform symbol-level spreading on the second to-be-sent information according to the generated spreading sequence for symbol-level spreading; and the processor 1201 is configured to generate a spreading sequence for transmission time interval-level spreading according to the acquired transmission time interval-level spreading factor, and perform transmission time interval-level spreading on the second to-be-sent information according to the generated spreading sequence for transmission time interval-level spreading, where the spreading sequence for frequency domain spreading is a ZC sequence or a Gray code.

The transmission time interval-level spreading factor may include an actual spreading factor and a replication factor;

the processor 1201 is configured to generate the spreading sequence for transmission time interval-level spreading according to the actual spreading factor; and the processor 1201 is further configured to replicate second transmission time interval-level spreading information according to the replication factor, where the second transmission time interval-level spreading information is information obtained after transmission time interval-level spreading is performed on the second to-be-sent information according to the generated spreading sequence for transmission time interval-level spreading.

To sum up, the base station provided in this embodiment of the present disclosure acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the base station provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with the base station by using a same physical channel at the same time, thereby achieving an objective of improving system capacity and resource utilization. The base station provided in this embodiment of the present disclosure further determines an appropriate spreading factor according to a predetermined spreading factor selection policy, thereby achieving an objective of reducing transmit power when a quantity of repetitive data sending times actually needed by the user equipment is relatively small. In addition, the base station provided in this embodiment of the present disclosure further performs transmission time interval-level spreading on to-be-sent information according to an actual spreading factor, and replicates, according to a replication factor, information obtained after the transmission time interval-level spreading, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

Figure 13:
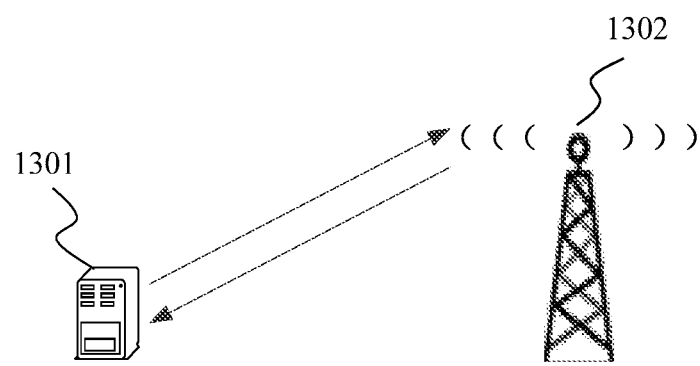
FIG. 13 is a system composition diagram of a wireless communications system according to an embodiment of the present disclosure.

Refer to FIG. 13, which shows a wireless communications system provided in an embodiment of the present disclosure, where the wireless communications system is generally applied to an M2M scenario. The wireless communications system may include:

user equipment 1301 shown in FIG. 5 or FIG. 6 and a base station 1302 shown in FIG. 9 or FIG. 10.

To sum up, in the wireless communications system provided in this embodiment of the present disclosure, user equipment or a base station acquires a frequency domain spreading factor, a symbol-level spreading factor and a transmission time interval-level spreading factor, and sends or receives information according to the acquired spreading factors, so that when information is sent, an effect of sending of to-be-sent information subjected to spreading is the same as an effect of simple repetitive sending of the to-be-sent information, and a quantity of repetition times is a product of the three spreading factors; or when information is received, because spreading sequences generated according to the spreading factors and between different user equipments are orthogonal to each other, interference from another piece of user equipment can be eliminated by performing despreading on the received information according to the spreading factors. Therefore, the wireless communications system provided in this embodiment of the present disclosure solves problems in the prior art that when simple repetitive sending is performed in a frequency domain or time domain, sending efficiency is low, delay is relatively long, and interference between user equipments in a same frequency is relatively severe, so that different user equipments can perform wireless communication with the base station by using a same physical channel at the same time, thereby achieving an objective of improving system capacity and resource utilization. In the wireless communications system provided in this embodiment of the present disclosure, the base station determines an appropriate spreading factor according to a predetermined spreading factor selection policy, thereby achieving an objective of reducing transmit power when a quantity of repetitive data sending times actually needed by the user equipment is relatively small. In addition, in the wireless communications system provided in this embodiment of the present disclosure, the user equipment or the base station further performs transmission time interval-level spreading on to-be-sent information according to an actual spreading factor, and replicates, according to a replication factor, information obtained after the transmission time interval-level spreading, thereby solving a problem that when a value of the transmission time interval-level spreading factor is excessively large, a channel environment may be caused to change, and orthogonality between spreading codes is affected, and achieving an objective of ensuring the orthogonality between the spreading codes while achieving an actually needed spreading effect.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A wireless communications method, comprising:
acquiring a transmission time interval-level spreading factor;
determining an actual spreading factor and a replication factor according to the transmission time interval-level spreading factor, wherein the transmission time interval-level spreading factor is a product of the actual spreading factor and the replication factor;
performing transmission time interval-level spreading on first to-be-sent information according to the actual spreading factor, to obtain a first transmission time interval-level spreading information;
replicating the first transmission time interval-level spreading information according to the replication factor, to obtain spread information; and
transmitting the spread information.

2. The method according to claim 1, wherein the acquiring the transmission time interval-level spreading factor comprises:
  receiving the transmission time interval-level spreading factor that is sent by a base station.

3. The method according to claim 1, wherein the performing the transmission time interval-level spreading on the first to-be-sent information according to the actual spreading factor comprises:
  repeating the first to-be-sent information according to the actual spreading factor, wherein a number of repetitions equals to the actual spreading factor value, to obtain the first transmission time interval-level spreading information.

4. The method according to claim 1, wherein a number of replicating time equals to the replication factor value.

5. A wireless communications method, comprising:
  acquiring a transmission time interval-level spreading factor;
  determining an actual spreading factor and a replication factor according to the transmission time interval-level spreading factor, wherein the transmission time interval-level spreading factor is a product of the actual spreading factor and the replication factor; and
  receiving a first information according to the replication factor and the actual spreading factor, wherein the receiving the first information according to the replication factor and the actual spreading factor comprises:
  receiving a spread information, and
  determining the first information according to the replication factor, the actual spreading factor, and the spread information.

6. The method according to claim 5, wherein the acquiring the transmission time interval-level spreading factor comprises:
  receiving the transmission time interval-level spreading factor that is sent by a base station.

* * * * *